(12) United States Patent
Layne et al.

(10) Patent No.: US 7,314,132 B2
(45) Date of Patent: Jan. 1, 2008

(54) RODLESS CONVEYOR BELT OR CHAIN

(75) Inventors: James L. Layne, Bowling Green, KY (US); Otto Jorgen Draebel, Copenhagen (DK); Mark T. Johnson, Glasgow, KY (US); Michael D. McDaniel, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 198 days.

(21) Appl. No.: 10/505,943

(22) PCT Filed: Feb. 26, 2003
(Under 37 CFR 1.47)

(86) PCT No.: PCT/US03/05666

§ 371 (c)(1),
(2), (4) Date: Aug. 26, 2004

(87) PCT Pub. No.: WO03/072464

PCT Pub. Date: Sep. 4, 2003

(65) Prior Publication Data

US 2005/0067262 A1 Mar. 31, 2005

Related U.S. Application Data

(60) Provisional application No. 60/435,221, filed on Dec. 18, 2002, provisional application No. 60/423,067, filed on Nov. 1, 2002, provisional application No. 60/359,582, filed on Feb. 26, 2002.

(51) Int. Cl.
*B65G 17/06* (2006.01)

(52) U.S. Cl. .................... 198/850; 198/851; 198/852; 198/853

(58) Field of Classification Search ......... 198/850–853
See application file for complete search history.

(56) References Cited

U.S. PATENT DOCUMENTS 237,591 A 2/1881 Pope (Continued)

FOREIGN PATENT DOCUMENTS

EP 0 201 317 11/1986

(Continued)

OTHER PUBLICATIONS

SmartMove Modular Conveyors Products and Accessories Catalog, Fall River, MA.

(Continued)

*Primary Examiner*—Douglas A Hess
(74) *Attorney, Agent, or Firm*—King & Schickli, PLLC

(57) ABSTRACT

A unitary modular link or link section for use in forming a rodless conveyor belt or a section thereof is provided. The link section includes a plurality of laterally-repeating link-shaped portions, each including an apex portion and a pair of leg portions. Each apex portion includes a receiver for receiving an integral first connector extending between the leg portions of a next-adjacent link or link section, preferably in snap-fit engagement, such that relative pivoting movement is established. A second integral connector maybe provided between the leg portion of each adjacent apex portion to create an engagement surface for a tooth of a drive or idler sprocket. The underside surface of each link section may also be specially contoured or curved to facilitate smooth passage over a guide structure.

33 Claims, 19 Drawing Sheets

U.S. PATENT DOCUMENTS

| | | | |
|---|---|---|---|
| 377,120 A | 1/1888 | Schofield | |
| 382,554 A | 5/1888 | Redick et al. | |
| 2,695,095 A | 11/1954 | Anderson | |
| 3,069,923 A | 12/1962 | Lengyel | |
| 3,160,024 A | 12/1964 | Mojonnier | |
| 3,202,266 A * | 8/1965 | Schmermund | 198/850 |
| 3,415,136 A | 12/1968 | Mojonnier | |
| 3,513,965 A | 5/1970 | Miller | |
| 3,628,834 A | 12/1971 | Anderson | |
| 3,879,935 A | 4/1975 | Fischer | |
| 3,980,425 A | 9/1976 | Pinettes et al. | |
| 4,329,818 A * | 5/1982 | Kavcic | 451/85 |
| 4,394,901 A | 7/1983 | Roinestad | |
| 4,473,365 A | 9/1984 | Lapeyre | |
| 4,597,747 A | 7/1986 | Lapeyre | |
| 4,815,270 A | 3/1989 | Lapeyre | |
| 4,815,271 A | 3/1989 | Lapeyre | |
| 4,882,901 A | 11/1989 | Lapeyre | |
| D307,707 S | 5/1990 | Abbestam et al. | |
| 4,951,457 A | 8/1990 | Deal | |
| 4,953,693 A | 9/1990 | Draebel | |
| 5,031,757 A | 7/1991 | Draebel et al. | |
| 5,125,504 A * | 6/1992 | Corlett et al. | 198/850 |
| 5,197,591 A * | 3/1993 | Roinestad et al. | 198/867.1 |
| 5,215,185 A | 6/1993 | Counter et al. | |
| 5,247,789 A | 9/1993 | Abbestam et al. | |
| 5,346,060 A | 9/1994 | Ferguson | |
| 5,425,443 A | 6/1995 | van Zijderveld et al. | |
| 5,547,071 A | 8/1996 | Palmaer et al. | |
| 5,562,200 A | 10/1996 | Daringer | |
| 5,797,820 A | 8/1998 | Endo | |
| 5,964,340 A | 10/1999 | Dolan | |
| 5,967,296 A | 10/1999 | Dolan | |
| 5,996,776 A | 12/1999 | van Zijderveld | |
| D419,742 S | 1/2000 | Abbestam | |
| D420,483 S | 2/2000 | Abbestam | |
| D427,898 S | 7/2000 | Loh | |
| 6,138,820 A * | 10/2000 | Ewert | 198/850 |
| 6,158,575 A | 12/2000 | Hitz | |
| 6,223,889 B1 | 5/2001 | Layne et al. | |
| 6,250,458 B1 | 6/2001 | Shibayama et al. | |
| 6,305,530 B1 | 10/2001 | Guldenfels | |
| 6,347,699 B1 * | 2/2002 | Ramsey | 198/852 |
| 6,364,095 B1 | 4/2002 | Layne et al. | |
| 6,382,404 B1 | 5/2002 | Guldenfels | |
| 6,443,795 B1 | 9/2002 | Lin | |
| 6,471,047 B2 | 10/2002 | Shibayama et al. | |
| 6,473,945 B1 | 11/2002 | Draper | |
| D473,032 S | 4/2003 | Altom | |
| D483,168 S | 12/2003 | McDaniel et al. | |
| 6,732,856 B2 | 5/2004 | Maine, Jr. | |
| 6,874,617 B1 * | 4/2005 | Layne | 198/779 |
| 7,108,126 B2 * | 9/2006 | Layne et al. | 198/852 |

FOREIGN PATENT DOCUMENTS

| | | |
|---|---|---|
| GB | 2 282 115 | 3/1995 |
| NL | 7202250 | 8/1973 |

OTHER PUBLICATIONS

Rex MatTop Chains, "New 5700 Series High Performance Chains," Bulletin No. 8022, Nov. 1993, Rexnord Corporation, Milwaukee, WI.

"Smart Move. We are the Safest Conveyor on the Market Today," SmartMove Modular Conveyors, www.4smartmove.com/smartmove.htm, Fall River, MA.

* cited by examiner

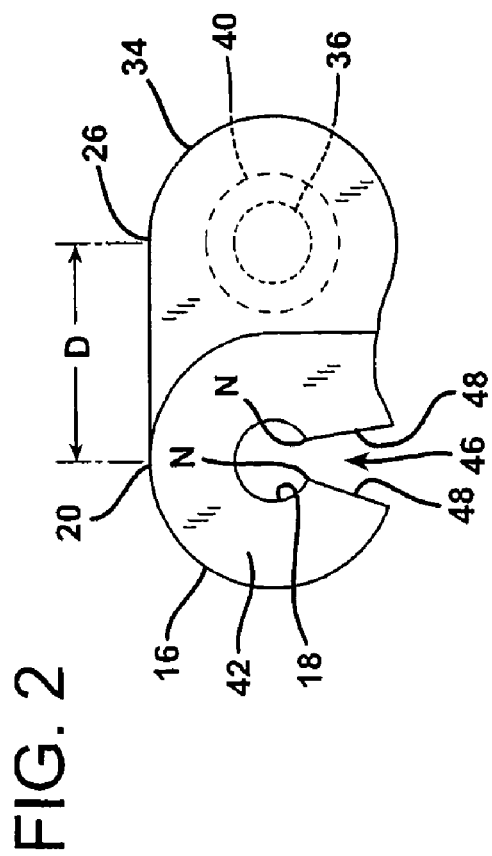
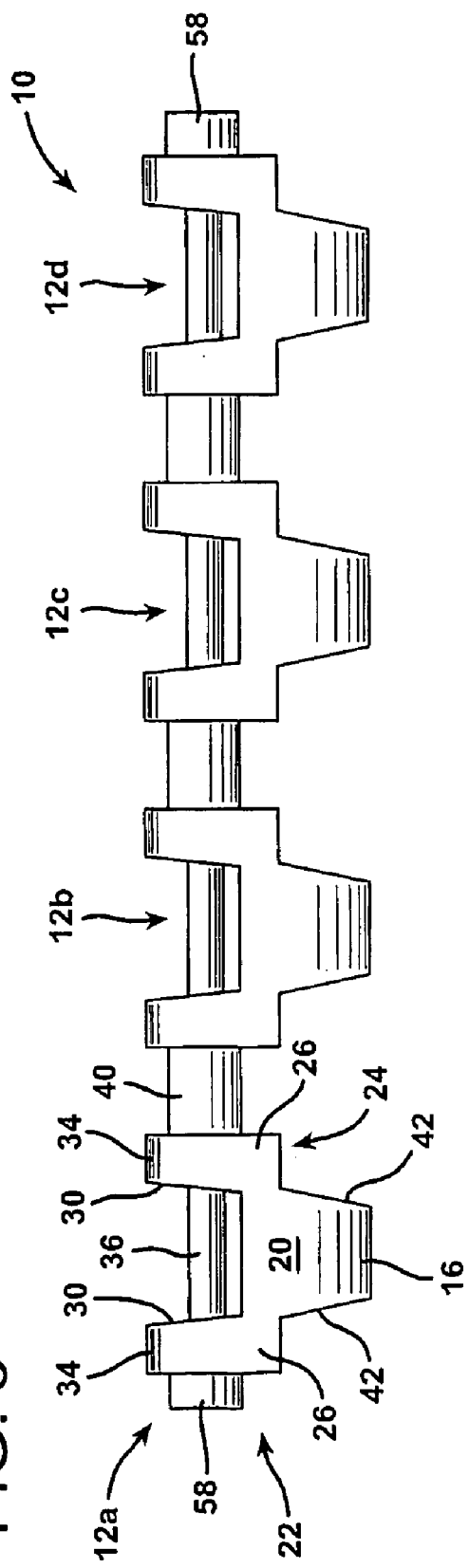
FIG. 2
FIG. 3

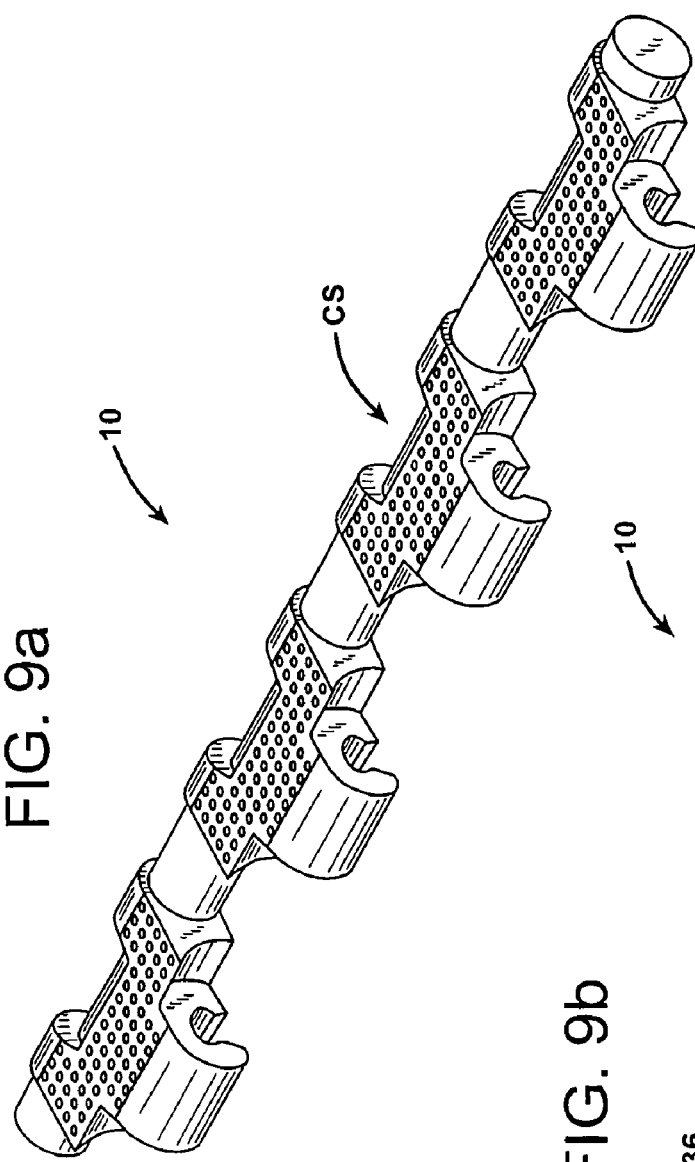
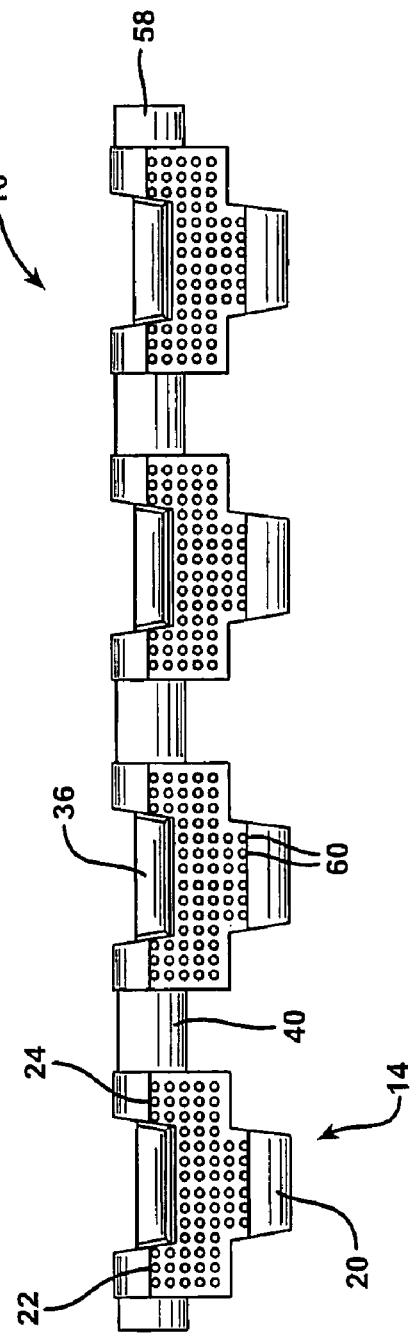

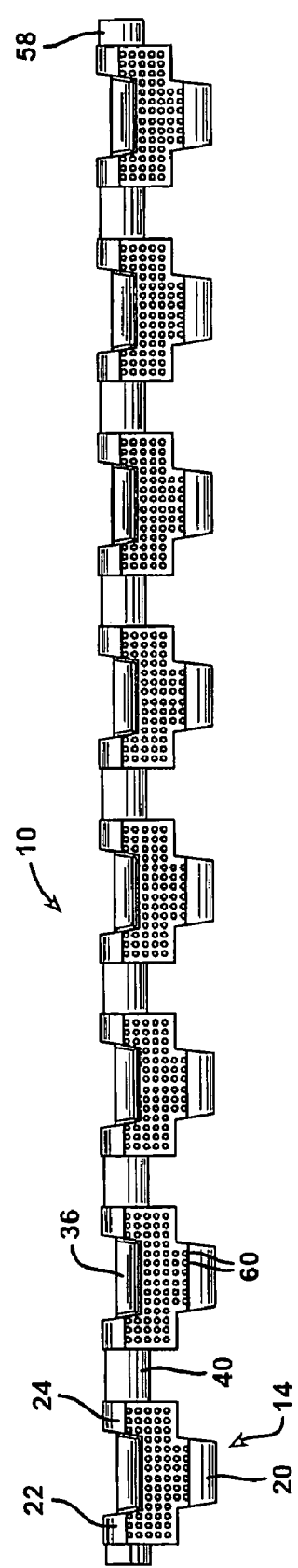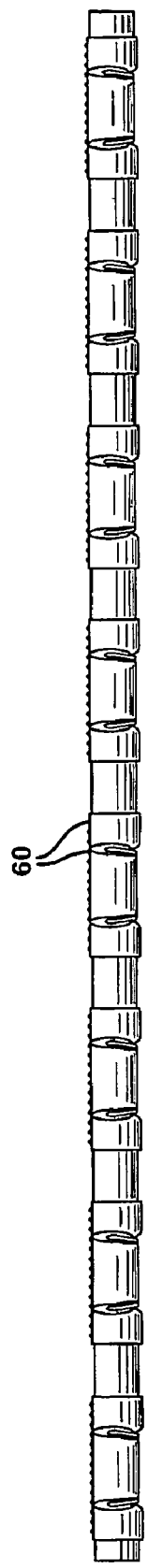

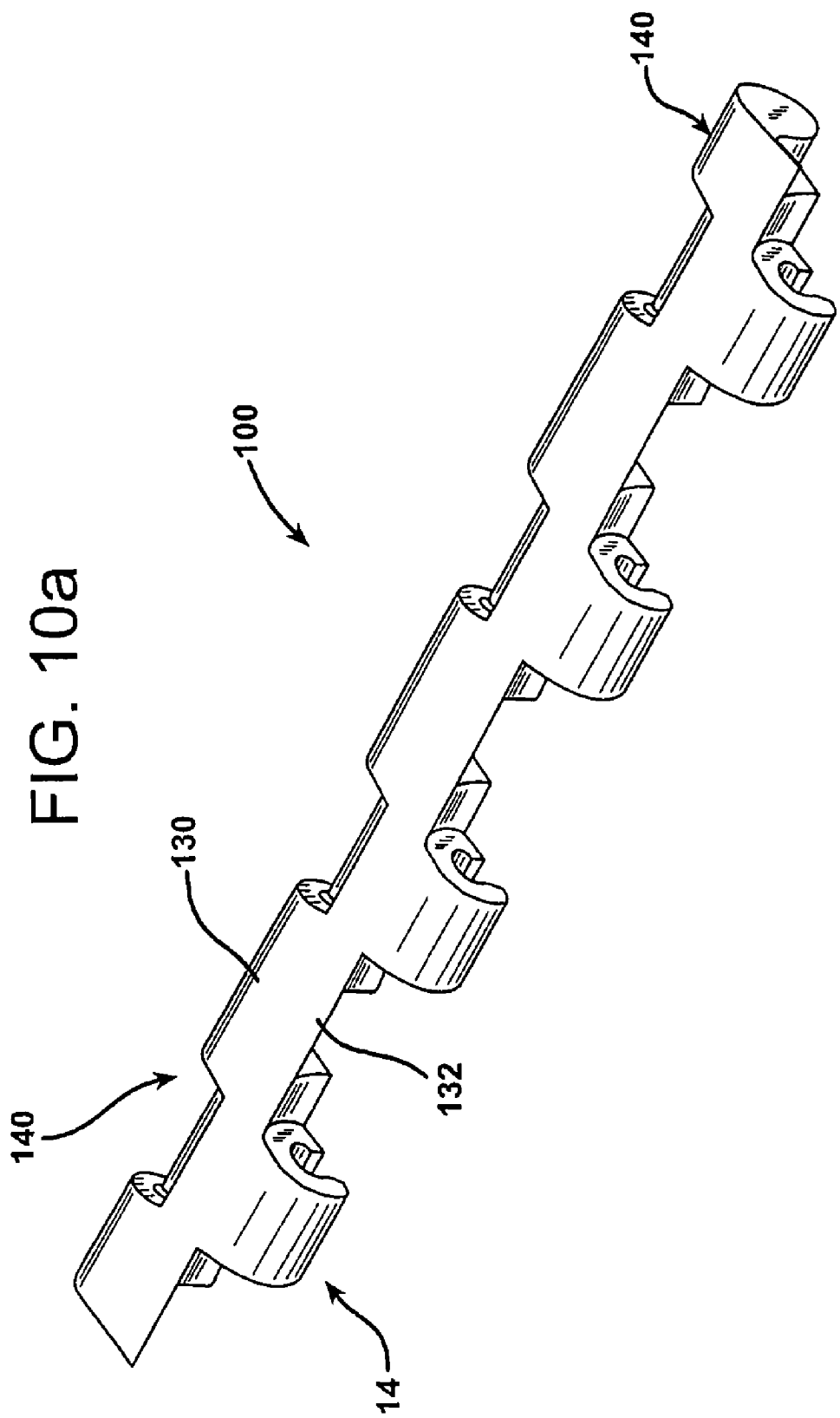

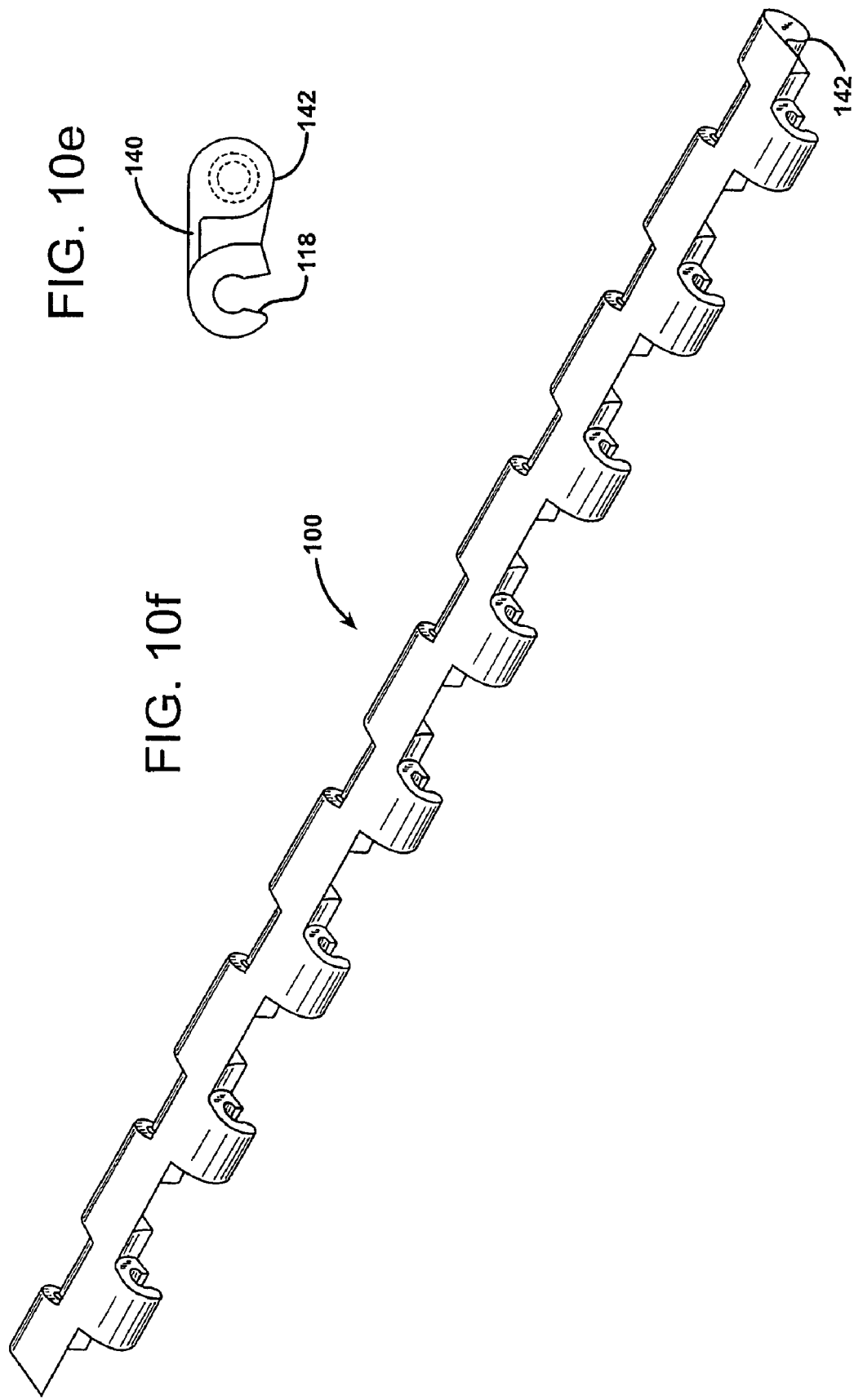

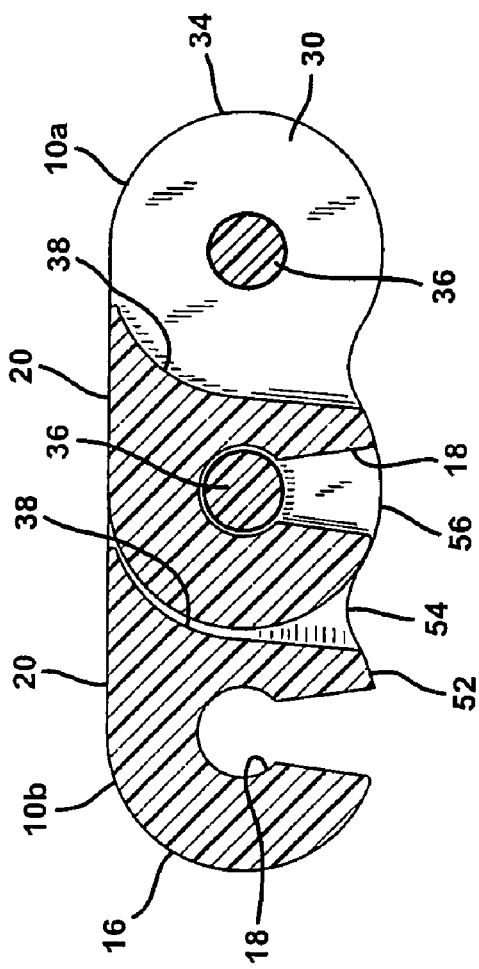
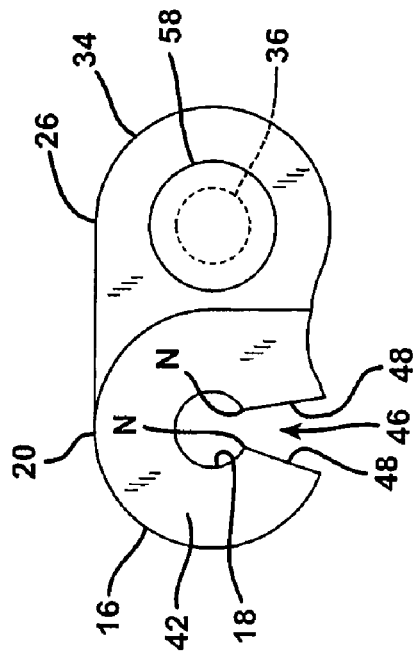
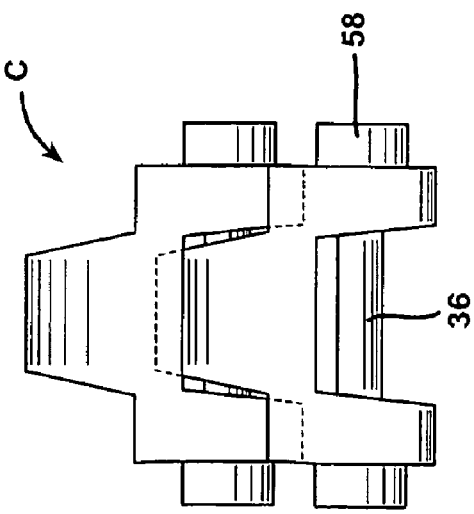
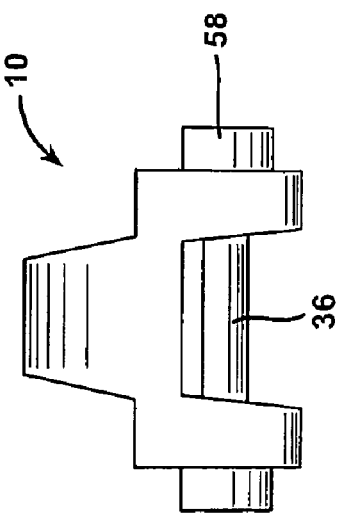

RODLESS CONVEYOR BELT OR CHAIN

This application claims the benefit of U.S. Provisional Patent Application Ser. Nos. 60/359,582, filed Feb. 26, 2002, 60/423,067, filed Nov. 1, 2002, and 60/435,221, filed Dec. 18, 2002.

TECHNICAL FIELD

The present invention relates to the conveyor art and, more particularly, to a modular link or link section for forming a "rodless" conveyor belt or chain, including a portion or section thereof.

BACKGROUND OF THE INVENTION

Today, in many modern manufacturing facilities, modular conveyor systems are extensively utilized to transport articles to and from various work stations during all stages of production. In recent years, manufacturers using production lines with conveyors as an integral component of the material handling system have realized reasonably significant gains in productivity and resource utilization. As a result, modular conveyor systems have become even more widely implemented and have been adapted to meet an even wider scope of the material handling needs of producers of a multitude of consumer and industrial goods. Therefore, the continual development of improved modular conveyors is necessary in order to keep pace with the demands and expectations of the users of such conveyors.

Conventional conveyor systems employing endless, modular link or roller belts or chains are typically driven at one end of an elongated guide structure, such as a rail or the like supported above the ground by a frame. The driving force is transmitted from a motive device, such as a variable speed electric motor, to a plurality of gang-driven sprockets coupled to a rotating drive structure, such as a shaft or drum. At the opposite end of the guide structure, idler sprockets are coupled to a freely-rotating idler shaft or drum. As should be appreciated, the drive and idler sprockets assist in supporting and guiding the endless belt or chain as it makes the transition from the forward run to the return run, or vice versa, at each respective end of the guide structure. Intermediate drive units, including frictional drives, may also be used in place of or in addition to the end drive unit.

Oftentimes, the belts or chains used in such conveyors are formed of a plurality of laterally repeating modular links, or unitary link sections comprising a plurality of laterally repeating link-shaped structures (collectively referred to as "links"). The links are typically formed of a low-cost, high strength, wear resistant material, such as Acetal or UHMW polypropylene). To form the belt, a plurality of links or link sections are positioned in interdigitating, longitudinally repeating TOWS. Each row is then connected to the adjacent row by a transverse connecting rod that projects through one or more apertures in a first, usually leading portion of a first link or link section and one or more apertures or slots in a second, or trailing portion of the next-adjacent link or link section. At both lateral ends of each row, a slot is provided for receiving a locking structure, such as a tab, that holds the transverse connector rod in place. Similar types of links and belts/chains formed thereof may be found in commonly assigned U.S. Pat. Nos. 4,953,693 and 5,031,757, the disclosures of which are incorporated herein by reference. Due to their low-cost, adaptability and long service life, belts or chains formed in this fashion have gained widespread acceptance among those seeking conveying solutions.

In the past, others have recognized the potential value of a belt formed of a plurality of interconnected links, yet capable of behaving almost like it is formed of a continuous piece of material, such as a fabric. One example is found in U.S. Pat. No. 5,967,296 to Dolan, which discloses a belt including a plurality of link sections, each having laterally and longitudinally offset spherical beads with apertures for receiving a plastic transverse connector rod. Once inserted through the aligned apertures in a pair of interdigitated link sections, both ends of the connector rod are mutilated, such as by melting the ends and then smashing them against the end of the adjacent link section. The mutilated ends capture the rod in place between the link sections to form a belt section.

While the belt disclosed in the '296 patent is ostensibly capable of behaving more like a continuous piece of material than a conventional modular link conveyor belt, significant disadvantages exist with this approach. The primary disadvantage is the need for an extraordinary number of man hours to form the belt. In particular, the assembler must position two link sections adjacent to each other, align them in an interdigitated relationship, and then thread the narrow plastic rod through the aligned apertures. Since there are no locking tabs or the like, both ends of the connector rod must then be mutilated to ensure that it remains held in place. These actions must be repeated hundreds of times to form the belt, which greatly contributes to the manufacturing time, effort, and expense. Also, if even a single transverse rod is not correctly installed, such as if the mutilation operation is not carried out properly, it can slide out of position over time and possibly allow for a complete failure of the belt or chain. Of course, such a failure contributes to deleterious downtime, and the steps required to complete a repair operation are as time-consuming and difficult as the original assembly operation. Depending on the circumstances, the mutilated end may also inhibit one link section from freely pivoting relative to the next-adjacent link section.

In the past, others have proposed different types of conveyor chain or belts that eliminate the need for the transverse connector rod. For example, a compressible "rodless" belt in which each link includes opposed integral stub shafts that are loosely received in opposed box-shaped structures on the next-adjacent link is shown in Ashworth Brothers' U.S. Pat. No. 4,394,901 to Roinestad. While this type of arrangement generally serves a particular need or purpose, it is not without limitations. For example, the links disclosed in the '901 patent are not readily adaptable for being scaled down to create a "micropitch" belt or chain, since each includes many intricate features that would be exceptionally difficult to replicate in a substantially smaller version (e.g., a link that is less than about 6 millimeters in height). Moreover, in the case of lightweight plastic materials, the strength of structures such as the opposed integral stub shafts projecting from each link maybe compromised if made substantially smaller. The height-to-pitch ratio of the belt depicted in that patent is also low (e.g., 5 millimeters/27 millimeters, or around 0.25), which means that it is not well-suited for traversing over structures having a small radius of curvature, such as the rounded end of a bed in a transfer conveyor, a nose bar, or like structure.

Accordingly, a need is identified for an improved variety of modular links or link sections capable of being interconnected without the need for separate transverse connecting rods to form a relatively wide "rodless" belt. This would greatly reduce the assembly time, effort and expense without substantially compromising the durability, strength, or service life of the resulting belt or chain. In cases where the links or link sections are formed of plastic materials, the use of integral connectors formed of the same materials would also result in a weight savings per unit length as compared to the conventional modular link belt including metal (stainless steel) transverse connector rods. Forming the belt or chain from a plurality of links or link sections to create a relatively wide conveying surface, and possibly one with a completely flat top portion, would facilitate receiving and transporting many different types of articles, including possibly as salt of a transfer assembly positioned between the ends of two adjacent conveyors. Driving the belt or chain could also be accomplished using a sprocket or a friction drive, which would enhance the versatility and concomitantly increase the options available to the conveyor system designer. The elimination of the connector rods would also greatly facilitate forming a "micropitch" belt or chain using such links or link sections, which could be used in regular conveyors, transfer conveyors, or the like. Overall, a "rodless" belt or chain having these capabilities would fulfill a long-felt need by solving the various problems and addressing the limitations of prior art belts or chains identified in the foregoing discussion.

SUMMARY OF THE INVENTION

In accordance with a first aspect of the invention, a modular link section for intended use in coupling with an adjacent link or link section to form a part of a conveyor belt for conveying articles or products is disclosed the link section comprises a unitary body including a plurality of laterally repeating link-shaped portions. Each link-shaped portion includes a surface capable of engaging or assisting in supporting the articles or products being conveyed, a pair of leg portions, at least one first integral connector extending between the leg portions, and a receiver capable of receiving a portion of the adjacent link in snap-fit engagement. The snap-fit engagement allows for the easy and secure assembly of the link or link section with the adjacent one to form the part of the conveyor belt.

In one embodiment, the receiver includes an oversized entryway and opposed, inwardly sloping or tapered sidewalls that form a neck. In use, the portion of the adjacent link section passes through the oversized entryway, along the inwardly sloping sidewalls, and snaps past the neck to become captured in the receiver, thereby creating the desired snap-fit engagement. The leg portions of each link-shaped portion may also include an outer sidewall, and a second integral connector may be provided between the outer sidewall of one leg portion of a first link-shaped portion and the adjacent outer sidewall of one leg portion of a second, adjacent link-shaped portion. The second integral connector is adapted for engaging a tooth on a drive or idler sprocket for driving or guiding the belt.

In accordance with a second aspect of the invention, a unitary modular link for intended use in coupling with an adjacent link to form a part or section of a conveyor belt for conveying articles or products is disclosed. The link comprises a plurality of laterally repeating apex portions, each including a surface capable of engaging or assisting in supporting the articles or products being conveyed. A pair of leg portions extend from each apex portion, and at least one integral connector is positioned between the leg portions. Each apex portion includes a receiver capable of receiving a portion of the adjacent link in snap-fit engagement. This allows for the easy and secure assembly of the link with the adjacent link to form the part or section of the conveyor belt.

In one embodiment, the receiver in each apex portion includes an oversized entryway and opposed, inwardly sloping or tapered sidewalls that form a neck. Accordingly, the portion of the adjacent link passes through the oversized entryway, along the sloping sidewalls, and snaps past the neck to become captured in the receiver and create the desired snap-fit engagement. The leg portions of each apex portion may further include an outer sidewall. A second integral connector is provided between the outer sidewall of one leg portion of a first apex portion and the adjacent outer sidewall of one leg portion of a second, adjacent apex portion. The second integral connector is adapted for engaging a tooth on a drive or idler sprocket for driving or guiding the belt.

In a particularly preferred embodiment, each apex portion includes a pair of outer sidewalls, each having a taper in the vertical plane. Moreover, each leg portion includes an inner sidewall having a slope that corresponds to the taper. Hence, when two links constructed in this manner are interconnected, the sidewalls cooperate or match and permit a particular degree of relative pivoting movement.

In accordance with a third aspect of the invention, a unitary modular link section for intended use in coupling with an adjacent link section to form a part or section of a conveyor belt for conveying articles or products is disclosed. The link section comprises at least two laterally repeating link-shaped portions adapted for engaging or assisting in supporting the articles or products. First and second leg portions also form a part of each link-shaped portion, and at least one first integral connector extends between the first and second leg portions. A second integral connector is also provided between the first leg portion of a first link-shaped portion and the adjacent, second leg portion of a second link-shaped portion. Each link-shaped portion further includes a receiver capable of receiving and capturing a portion of the next-adjacent link section.

In one embodiment, the first and second integral collectors are substantially cylindrical, with the second integral connector being larger in diameter than the first integral connector. In any case, each first connector is adapted for being received in a receiver of the next adjacent link or link section. Likewise, each second connector is adapted for being engaged by a tooth on a drive or idler sprocket for driving or guiding the belt.

In accordance with a fourth aspect of the invention, a modular link conveyor belt section for intended use in forming a part of an endless conveyor belt for conveying articles or products is disclosed. The belt section comprises a plurality of unitary link sections. Each link section includes a plurality of laterally repeating link-shaped portions, each having a surface for engaging or assisting in supporting the articles or products, a pair of leg portions, and at least one first integral connector. The link-shaped portions of a first one of the link sections each further include a receiver for receiving the first integral connector of a second, adjacent link section in snap-fit engagement, such that the first link section is capable of pivoting movement relative to the second link section. The snap-fit engagement allows for the easy and secure assembly of the link sections to form the conveyor belt section.

In one embodiment, the first integral connector extends between the leg portions of the second link section, and the receiver of each link-shaped portion on the first link section includes an oversized entryway and inwardly sloping sidewalls forming a neck. Hence, each first integral connector of the second link section passes through the oversized entryway, along the sloped sidewalls, and snaps past the neck to become captured in the receiver and form the desired snap-fit engagement. The leg portions of each link-shaped portion on one or both of the first and second link sections may include an outer sidewall and a second integral connector may be provided between the outer sidewall of one leg portion of a first link-shaped portion and the adjacent outer sidewall of the leg portion of a second, adjacent link-shaped portion. The second integral connector provides a surface for engaging a tooth on a drive or idler sprocket for driving or guiding the belt.

In one particular embodiment, each link-shaped portion includes an apex portion having a pair of outer sidewalls, with each sidewall having a taper in the vertical plane. Each leg portion of the second link section includes an inner sidewall having a slope that matches the taper. Consequently, the matching sidewalls facilitate relative pivoting movement to a limited degree between the first and second link sections.

In another embodiment, the underside surfaces of the first and second link sections are specially contoured or curved. Consequently, when these link sections are pivoted a certain, preselected amount, the underside surfaces may correspond to the contour of an adjacent guide structure, such as a cylindrical nosebar. As a result, the belt section is capable of smoothly traversing over the guide structure.

Each link-shaped portion may further include an apex portion having a generally arcuate or rounded nose and a matching recess. When two adjacent link sections are interconnected, the nose of each apex portion on the first link section cooperates with the recess of each apex portion on the second link section during relative pivoting movement. Likewise, each leg portion may include a generally arcuate or rounded leading recess and a matching trailing surface. In use, the trailing surface of each leg portion on the first link section cooperates with the leading recess of each leg portion on the second link section during relative pivoting movement.

In accordance with a fifth aspect of the invention, a modular link conveyor belt section for intended use in forming a part of an endless conveyor belt capable of conveying articles or products and traversing over a guide structure having a relatively small diameter, such as a nose bar, is disclosed. The belt section comprises a plurality of link sections, each including a plurality of laterally repeating link-shaped portions having a surface for engaging or assisting in supporting the articles or products, a pair of leg portions, and an integral connector. The link-shaped portion of a first one of the link sections includes a receiver for receiving the integral connector of a second link section such that the first link section is capable of pivoting relative to the second link section. The underside surfaces of both of the first and second link sections are specially contoured or curved such that when the link sections are pivoted a preselected amount, a curved profile is create that corresponds to the contour of the guide structure. As a result, smooth travel of the belt section over the guide structure is facilitated.

In one embodiment, the integral connector extends between the leg portions of the second link section and the receiver of each link-shaped portion on the first link section includes an oversized entryway and opposed, inwardly sloping sidewalls that form a neck. Hence, each integral connector of the second link section passes through the oversized entryway, along the sloping sidewalls, and snaps past the neck to become captured in the receiver and form the snap-fit engagement. The leg portions of each link-shaped portion on one or both of the first and second link sections may include an outer sidewall and a second integral connector may be provided between the outersidewall of one leg portion of a first link-shaped portion and the adjacent outer sidewall of the leg portion of a second, adjacent link-shaped portion. The second integral connector provides a surface for engaging a tooth on a drive or idler sprocket for driving or guiding the belt.

In one particular embodiment, each link-shaped portion includes an apex portion having a pair of outer sidewalls, with each sidewall having a taper in the vertical plane. Each leg portion of the second link section includes an inner sidewall, with the inner sidewall having a slope that matches the taper. In use, the matching sidewalls facilitate relative pivoting movement to a limited degree between the first and second link sections.

In another embodiment, each link-shaped portion includes an apex portion having a generally arcuate leading nose and a matching recess. When adjacent link sections are interconnected, the nose of each apex portion on the first link section is positioned closely to and moves along the recess of each apex portion on the section link section during relative pivoting movement. Likewise, each leg portion includes a generally arcuate leading recess and a matching trailing surface. In use, the arcuate leading recess of each leg portion on the second link section is positioned closely to and moves along the trailing surface of each leg portion on the first link section during relative pivoting movement.

In accordance with a sixth aspect of the invention, a unitary modular link section for intended use in coupling with an adjacent link or link section to form a part of a conveyor belt for conveying articles or products is provided. The link section comprises a plurality of laterally repeating link-shaped portions, each having a surface capable of engaging or assisting in supporting the articles or products being conveyed. A ratio of the height of each link-shaped portion to the width of each link-shaped portion is about 3.75. The snap-fit engagement allows for the easy and secure assembly of the link section with the next-adjacent link or link section to form the part of the conveyor belt.

In accordance with a seventh aspect of the invention, a unitary modular link section for intended use in coupling with an adjacent link or link section to form a part of a conveyor belt for conveying articles or products is provided. The link section comprises a plurality of laterally repeating link-shaped portions, each having a surface capable of engaging or assisting in supporting the articles or products being conveyed. A ratio of the height of each link-shaped portion to the width of each link-shaped portion is about 2.5. The snap-fit engagement allows for the easy and secure assembly of the link section with the next-adjacent link or link section to form the part of the conveyor belt.

In accordance with an eighth aspect of the invention, a unitary modular link for intended use in coupling with first and second adjacent links to form apart of a conveyor belt for conveying articles or products is disclosed. The link comprises at least one laterally repeating link-shaped portion having a receiver for receiving the first adjacent link in snap-fit engagement, a connector for connecting with the second adjacent link, and a surface capable of engaging or assisting in supporting the articles or products being conveyed. The height of the link is about six millimeters or less. The snap-fit engagement allows for the easy and secure assembly of the link section with the next-adjacent link or link section to forming the part of the conveyor belt.

In one embodiment, the height of the link-shaped portion is four millimeters and a width of each link-shaped portion is fifteen millimeters. Either four or eight laterally-repeating link-shaped portions may be provided. This allows for a belt or chain formed of the link sections to be easily created using the well-known brick-layering techniques.

In accordance with a ninth aspect of the invention, a unitary modular link section for intended use in coupling with an adjacent link or link section to form a part of a conveyor belt for conveying articles or products is disclosed. The link section comprises a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement. A second integral connector extends between the leg portions of adjacent link-shaped portions and defines a portion of the article support surface, such that a substantially continuous or uninterrupted article support surface is provided.

In accordance with a tenth aspect of the invention, a modular link conveyor belt section for intended use in forming apart of an endless conveyor belt capable of conveying articles or products is disclosed. The belt section comprises a plurality of link sections, each including a plurality of laterally repeating link-shaped portions having a surface for engaging or assisting in supporting the articles or products, a pair of leg portions, and an integral connector. Each link-shaped portion on a first one of said link sections includes a receiver for receiving the integral connector of a second link-shaped portion such that the first link section is capable of pivoting relative to the second link section. At least a portion of each link section is provided with a high-friction conveying surface, and preferably one that is integrally formed with the link section.

In accordance with an eleventh aspect of the invention, a modular link conveyor belt section for intended use in forming a part of an endless conveyor belt for conveying articles or products is disclosed. The belt section comprises a plurality of link sections, each including a plurality of laterally repeating link-shaped portions. Each link-shaped portion includes a surface for engaging or assisting in supporting the articles or products, a pair of leg portions, and at least one first integral connector. Each link-shaped portion on a first one of said link sections includes a receiver for receiving the first integral connector of a second, adjacent link section in snap-fit engagement such that the first link section is capable of pivoting movement relative to the second link section. A second integral connector is provided between one leg portion of a first link-shaped portion and the leg portion of a second, adjacent link-shaped portion. The second integral connector defines a portion of the conveying surface such that, when a plurality of the link sections are interconnected, a substantially uninterrupted, flat-top conveying surface is provided.

In accordance with a twelfth aspect of the invention, a unitary modular link section for intended use in coupling with an adjacent link or link section to form a part of a conveyor belt for conveying articles or products is disclosed. The link section comprises a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement. A second integral connector extends between the leg portions of adjacent link-shaped portions and defines a continuous portion of the article support surface. Moreover, the article support surface of each link section is convex or otherwise formed having a particular degree of curvature.

In accordance with a thirteenth aspect of the invention, a modular link conveyor belt section for intended use in forming a part of an endless conveyor belt capable of conveying articles or products is disclosed. The belt section comprises a plurality of link sections, each including a plurality of laterally repeating link-shaped portions having a surface for engaging or assisting in supporting the articles or products, a pair of leg portions, and an integral connector. Each link-shaped portion on a first one of said link sections includes a receiver for receiving the integral connector of a second link-shaped portion such that the first link section is capable of pivoting relative to the second link section. The article support surface of each link section is generally convex in cross-section.

In accordance with a fourteenth aspect of the invention, a unitary modular link section for intended use in coupling with an adjacent link or link section to form a part of a conveyor belt for conveying articles or products is disclosed. The link section comprises a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement. A second integral connector extends between the leg portions of adjacent link-shaped portions and defines a portion of the article support surface. The article support surface further includes at least one upstanding cleat.

In accordance with a fifteenth aspect of the invention, a modular link conveyor belt section for intended use in forming a part of an endless conveyor belt capable of conveying articles or products is disclosed. The belt section comprises a plurality of link sections, each including a plurality of laterally repeating link-shaped portions having a surface for engaging or assisting in supporting the articles or products, a pair of leg portions, and an integral connector. Each link-shaped portion on a first one of said link sections includes a receiver for receiving the integral connector of a second link-shaped portion such that the first link section is capable of pivoting relative to the second link section. Each link section is further provided with a generally upstanding cleat.

In accordance with a sixteenth aspect of the invention, a unitary modular link section for intended use in coupling with an adjacent link or link section to form a part of a conveyor belt for conveying articles or products is disclosed. The link section comprises a plurality of laterally repeating link-shaped portions, each having a surface capable of engaging or assisting in supporting the articles or products being conveyed, a pair of leg portions, at least one first integral connector extending between the leg portions, a receiver capable of receiving a portion of the adjacent link section in snap-fit engagement, and a pair of upstanding lugs. A second integral connector extends between the leg portions of adjacent link-shaped portions and defines a portion of the article support surface.

In accordance with a seventeenth aspect of the invention, a modular link conveyor belt section for intended use in forming a part of an endless conveyor belt capable of conveying articles or products is disclosed. The belt section comprises a plurality of link sections, each including a plurality of laterally repeating link-shaped portions having a surface for engaging or assisting in supporting the articles or products, a pair of leg portions, an integral connector, and a pair of upstanding lugs. Each link-shaped portion on a first one of said link sections includes a receiver for receiving the integral connector of a second link-shaped portion such that a first link section is capable of pivoting relative to a second link section.

In accordance with an eighteenth aspect of the invention, a link for intended use in coupling with first and second adjacent links in snap-fit engagement to form a part of a conveyor belt or chain for conveying articles or products is disclosed. The link comprises a body including a receiver capable of receiving a portion of the first adjacent link in snap-fit engagement, a connector adapted for being received by the second adjacent link, and a surface capable of engaging or assisting in supporting the articles or products being conveyed. A ratio of the height of the body to a pitch of the link is about 1.0. More preferably, the ratio is about 0.8 to 1.2. Also, the pitch may be measured from substantially the center of the receiver to substantially the center of the connector of the link. The height of the link is between about 4-6 millimeters and the pitch of the link is about 5 millimeters.

In accordance with a nineteenth aspect of the invention, a link for intended use in coupling with first and second adjacent links in snap-fit engagement to form a part of a conveyor belt or chain for conveying articles or products is disclosed. The link comprises a body including a receiver capable of receiving a portion of the first adjacent link in snap-fit engagement, a connector adapted for being received by the second adjacent link, and a surface capable of engaging or assisting in supporting the articles or products being conveyed. A ratio of the height of the body to a pitch of the link is greater than 0.8 and less than 1.2.

In accordance with a twentieth aspect of the invention, a conveyor belt or chain is disclosed. The belt or chain comprises a plurality of links, each adapted for engaging one another in snap-fit engagement and including a body having a receiver capable of receiving a portion of a first adjacent link in snap-fit engagement, a connector adapted for being received by a second adjacent link, and a surface capable of engaging or assisting in supporting the articles or products being conveyed. A ratio of the height of the body to a pitch of each link is about 1.0. More preferably, the ratio is between about 0.8 and 1.2.

BRIEF DESCRIPTION OF THE DRAWINGS

In the drawings:

FIG. 2 is an enlarged side elevational view of the link or link section of FIG. 1;

FIG. 3 is an enlarged top plan view of the link or link section of FIG. 1;

FIG. 6d is an enlarged top plan view showing the two interconnected links or link sections of FIG. 6a;

FIGS. 9a-9j show two different embodiments of the link including a high-friction surface for facilitating the conveyance of articles;

FIGS. 10a-10j show two different embodiments of the link-including a flat-top conveying surface;

FIGS. 14a-14d are views of a link including a single link-shaped portion and two of such links connected together by way of snap-fit engagement to form a narrow-width belt or chain.

DETAILED DESCRIPTION OF THE INVENTION

With reference to the perspective view of FIG. 1, a link or link section 10 (hereinafter "link section") for use in forming an endless conveyor belt C (see FIG. 8), such as for use as part of an overall conveyor system, is disclosed. As described further below, each link section 10 is readily adapted for coupling with an identical, next-adjacent link section, preferably in snap-fit engagement. This advantageously allows for the construction of a non-longitudinally-compressible, fixed length "rodless" conveyor belt (or sometimes referred to herein as a "chain"); that is, one in which the need for separate, removable transverse connector rods typically required in modular link conveyor belts or chains is eliminated. Moreover, as will be understood after reviewing the description that follows, the particular design of the link or link section 10 disclosed herein is readily adaptable to being scaled up or down, including to a relatively small size. When a plurality of relatively small link sections 10 are coupled together in an endless fashion, a "micropitch" belt (i.e., one having a pitch of about 5 millimeters, or otherwise capable of traversing over a nose bar having a relatively small diameter) results that is exceptionally strong and capable of conveying even relatively heavy articles at moderately high speeds. As will be further appreciated, an endless belt or chain formed of such link sections 10 behaves more like one formed of fabric, rubber, or like composite materials than one formed of a plurality of interconnected modular links or link sections. Yet, since the belt is "rodless," the complicated and time-consuming assembly techniques characteristic of prior art approaches and the need for extra structures, such as separate locking tabs, are avoided. The particular link section 10 is also adapted for being driven by either a sprocket or friction roller, including along both the forward and return runs of an endless conveyor system. This versatility not only enhances the options available to the conveyor designer, but also allows for the effective and efficient use of different types of drive units (including intermediate drives for driving or assisting in driving a belt along particularly lengthy sections of the conveyor).

Figure 1:
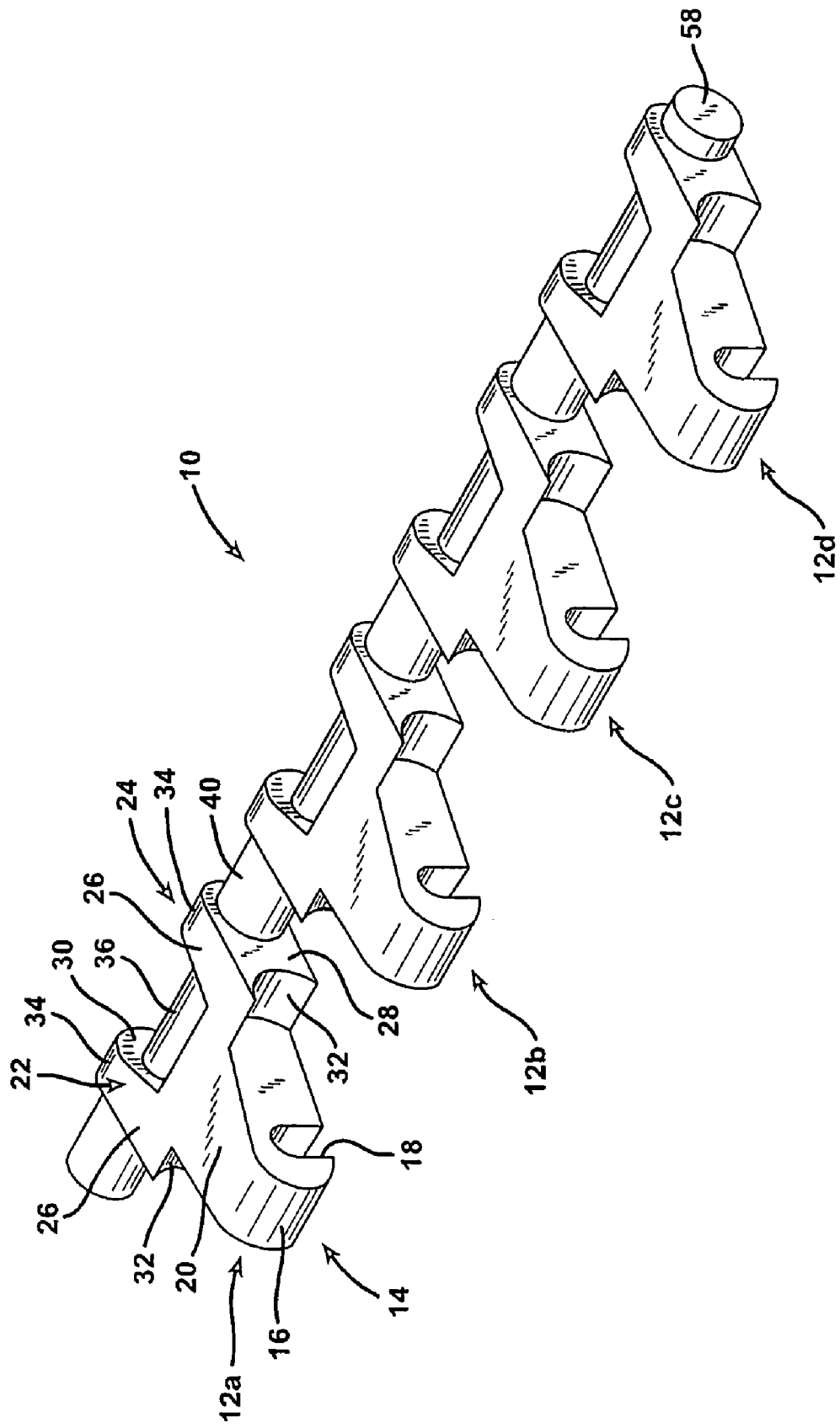
FIG. 1 is a slightly enlarged perspective view of a single link or link section constructed in accordance with one possible embodiment of the present invention.

Turning first to the perspective view of FIG. 1, a single link or link section 10 constructed in accordance with one possible embodiment of the present invention is disclosed. The link section 10 includes a plurality of laterally repeating link-shaped portions 12a . . . 12n, four of which (12a, 12b, 12c, 12d) are shown in the drawings for purposes of illustrating one possible embodiment of the invention. With specific reference to link-shaped portion 12a, it can be seen that it includes a first projecting end or apex portion 14. This first end or apex portion 14 preferably leads when used in forming a conveyor belt or chain, although it will be understood from the description that follows that a belt or belt section formed of a plurality of the link sections 10a . . . 10n (see FIGS. 6d and 8) is readily capable of being driven bidirectionally. The apex portion 14 includes a rounded nose 16 having a generally arcuate, rounded, or curved leading surface and a receiver 18, the details of which are provided in the description that follows. An upper surface 20 of the apex portion 14 when oriented as shown in FIG. 1 may be substantially planar and, thus, forms a surface capable of engaging or assisting in supporting the articles or products being transported (or possibly for engaging a drive roller when a friction-type drive is used).

At least two projections, which may be in the form of leg portions 22, 24, project or extend from the apex portion 14. In the illustrated embodiment, these leg portions 22, 24 include a generally planar upper surface 26 capable of engaging or assisting in supporting articles being conveyed. Each leg portion 22, 24 further includes an outer sidewall 28, an inner sidewall 30, a leading recessed portion 32, and a trailing portion 34. Both portions 32, 34 may be generally arcuate, rounded or curved. As will be understood more fully after reviewing the description that follows, the curvature of the leading recessed portion 32 may generally match the curvature of the trailing portion 34, such that the outer surfaces of these portions cooperate or mate together in an interdigitating fashion without interference when two of the link sections 10 are interconnected and caused to pivot relative to one another.

Positioned between the inner sidewalls 30 of the leg portions 22, 24 associated with each apex portion 14 is at least one first integral connector 36. The first integral connector 36 may be a single, continuous, generally cylindrical piece of material that extends between and is integrally formed in the opposed inner sidewalls 30 of each leg portion 22, 24. The first connector 36 is spaced from a recessed portion 38 of the corresponding apex portion 14 (see FIG. 6a). This recessed portion 38 is adapted for cooperating with the outer surface of the rounded nose 16 on the apex portion 14 of a next-adjacent link and, thus, is also generally arcuate, rounded or curved (see FIG. 5).

In the illustrated embodiment, a second integral connector 40 extends between the outer walls 28 of the adjacent leg portions 22, 24 and, thus, connects the adjacent, substantially identical link-shaped portions 12a, 12b, 12c, 12d to form the unitary link section 10. The second integral connector 40, like the first one, may also be barrel-shaped or cylindrical, but may be oversized as compared to the first connector 36. In certain applications, this may be desirable to ensure that a strong connection is established between the adjacent link-like or link-shaped portions 12a . . . 12n and that the article-carrying capabilities of the belt or chain are not compromised. As will further understood upon reviewing the description that follows, this second connector 40 may be designed for engaging a tooth on a drive or idler sprocket, when such a structure is used to drive or guide a belt formed of the link sections 10a . . . 10n. However, in the case where a non-sprocket type (e.g., friction roller) drive and idler combination is used, the connector need not have any particular shape or form.

Turning now to FIG. 2, the details of the receiver 18 formed in each apex portion 14 in one possible embodiment of the link section 10 are illustrated. The receiver 18 may include an entryway 46 (preferably oversized, but at a minimum sufficient to accommodate the first connector 36) and a pair of opposed sidewalls 48. The sidewalls 48 may slope inwardly towards each other when viewed from the side and, thus, form a neck N through which a structure, such as the first integral connector 36 of an adjacent link, may pass to create a snap-fit engagement. This snap-fit engagement is one of the many advantageous features of this link section 10, since it creates a secure, strong connection while avoiding the need for the removable-type of transverse connector rod and locking tabs characteristic of many prior art proposals. As will be appreciated from reviewing the description that follows, the elimination of these parts means that the link section 10 can be provided as a single, unitary piece, which facilitates scaling it up or down, including possibly for use as part of a "micropitch" belt or chain. Assembly of a belt section (or chain section, the terms "belt" and "chain" being used interchangeably throughout) using the link sections 10 is also made less time consuming and less expensive, both of which are considered significant advantages.

Figure 4:
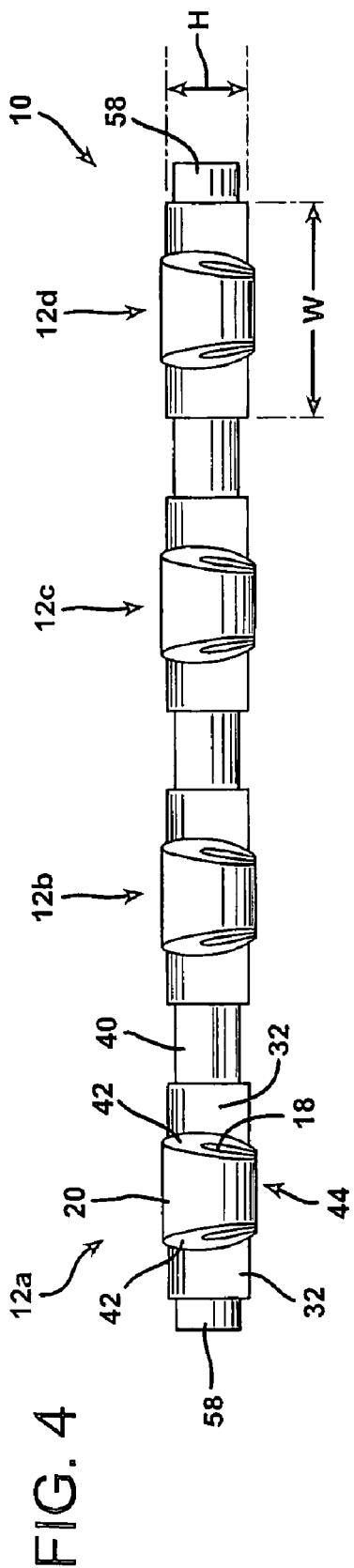
FIG. 4 is an enlarged front elevational view of the link or link section of FIG. 1.
Figure 5:
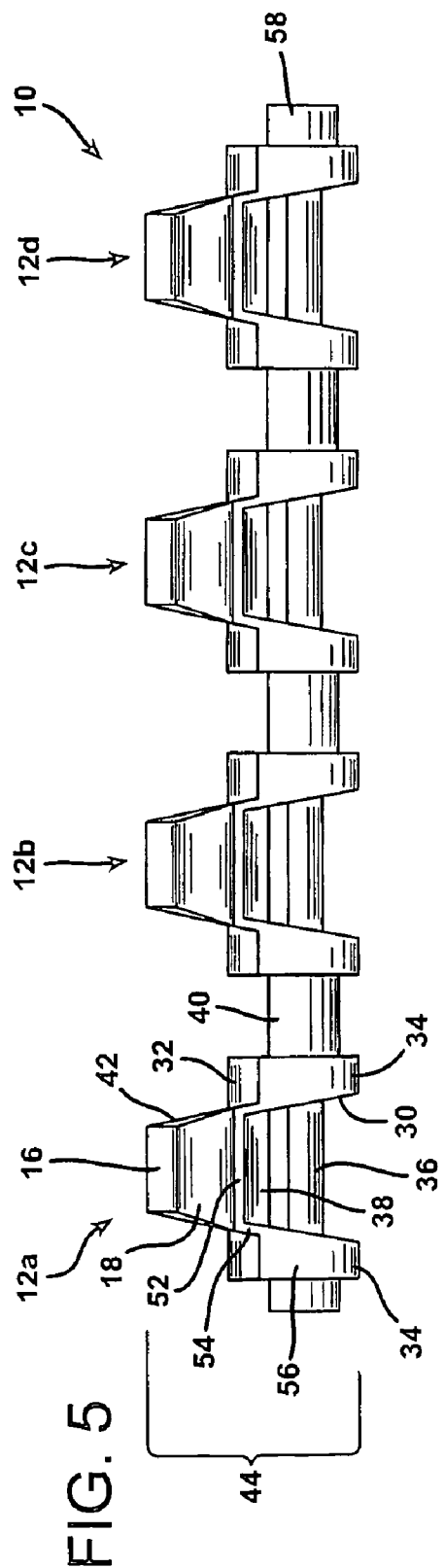
FIG. 5 is an enlarged bottom plan view of the link or link section of FIG. 1.
Figure 7:
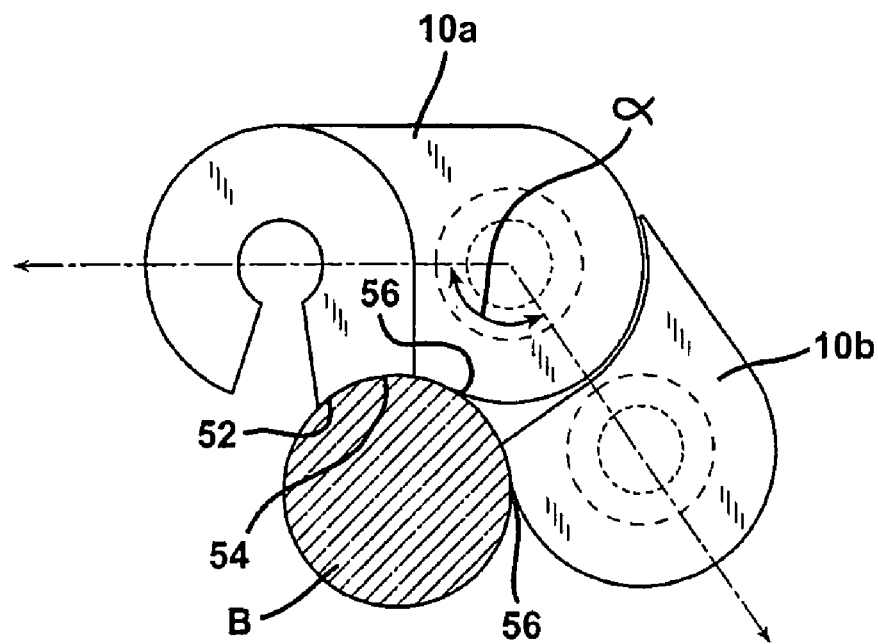
FIG. 7 is an enlarged side view showing the manner in which the specially contoured underside surface of each link or link section allows a belt section made of the links to smoothly traverse over a relatively small diameter guide structure, such as a nosebar.
Figure 8:
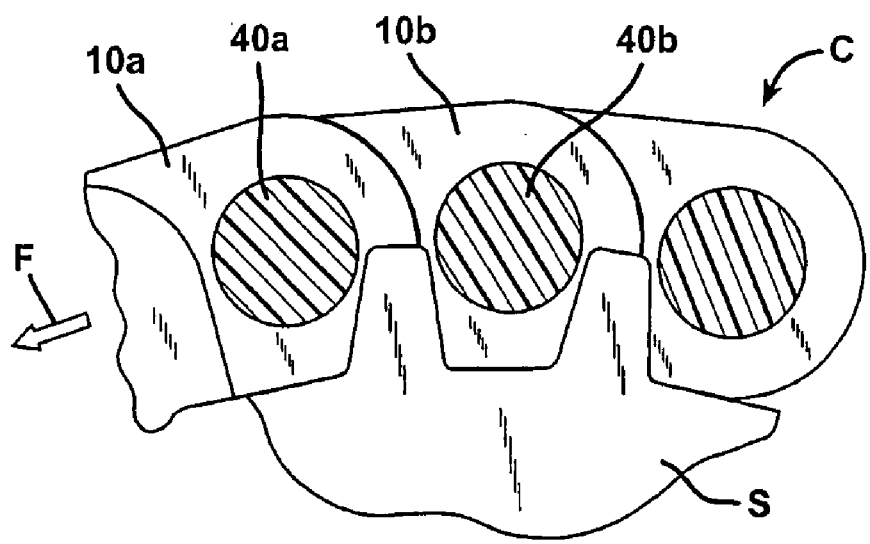
FIG. 8 is an enlarged, partially cross-sectional side view showing one possible manner of driving a belt comprised of a plurality of the links or link sections of FIG. 1.
Figure 9E:
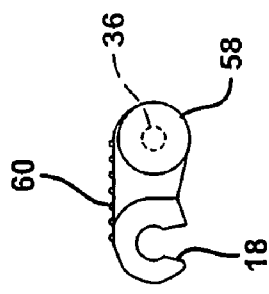
Figure 9C:
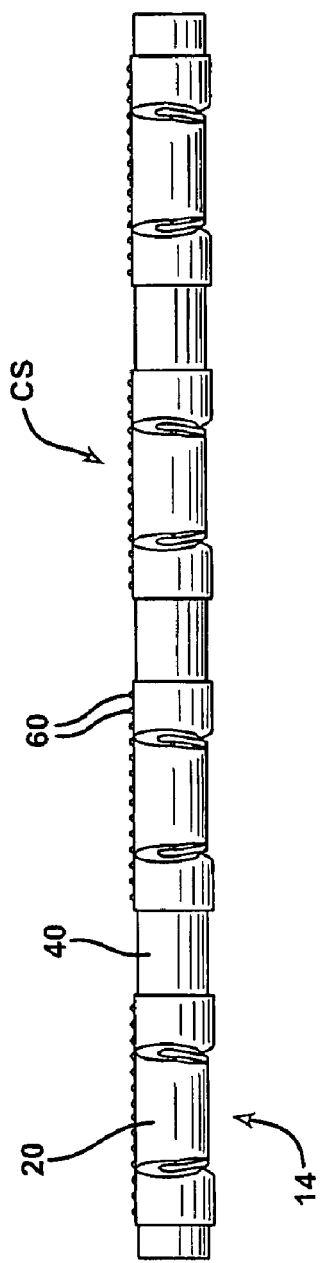
Figure 9D:
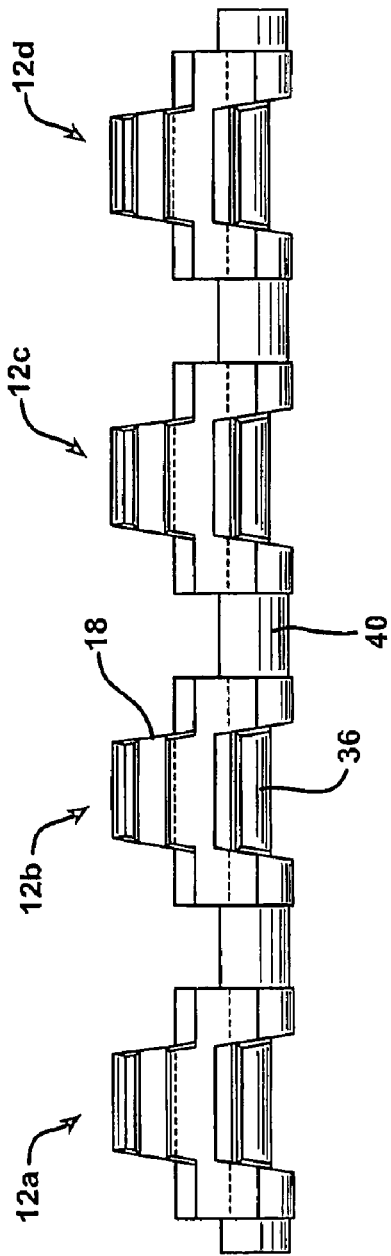
Figure 9I:
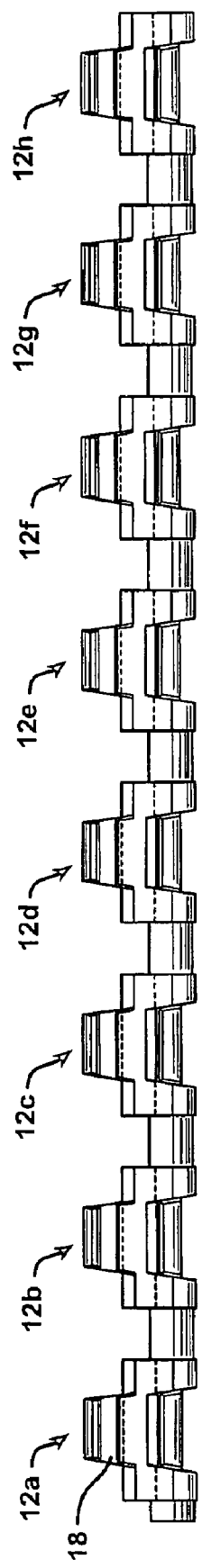
Figure 9J:
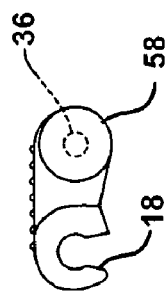
Figure 10B:
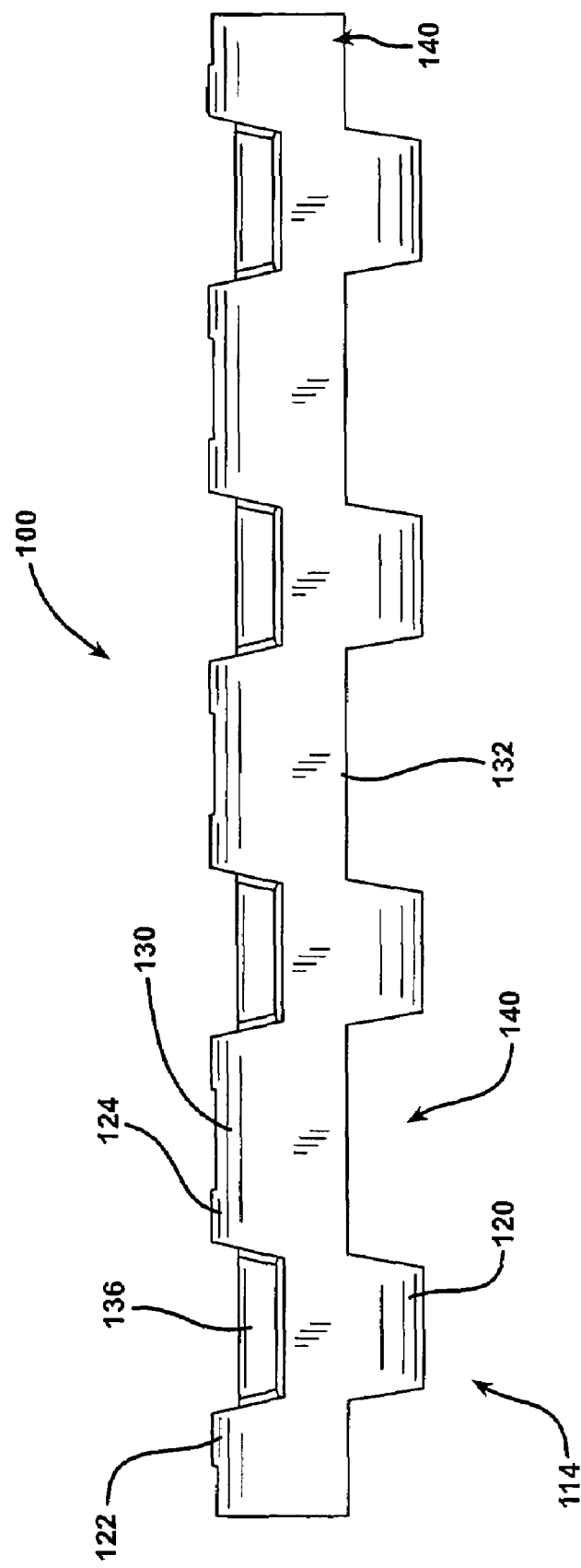
Figure 10C:
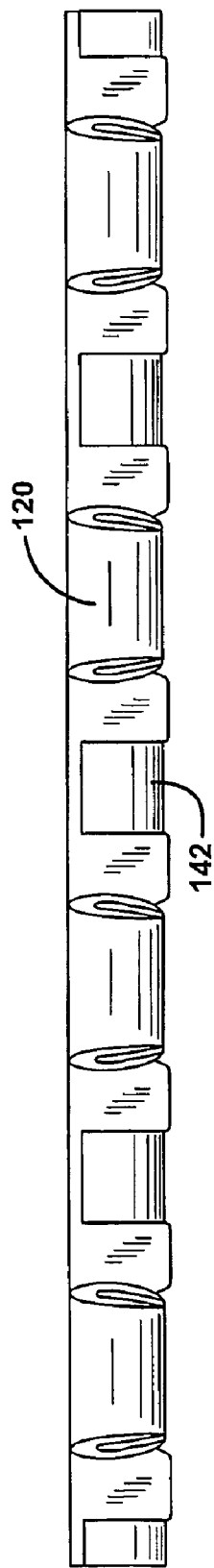
Figure 10D:
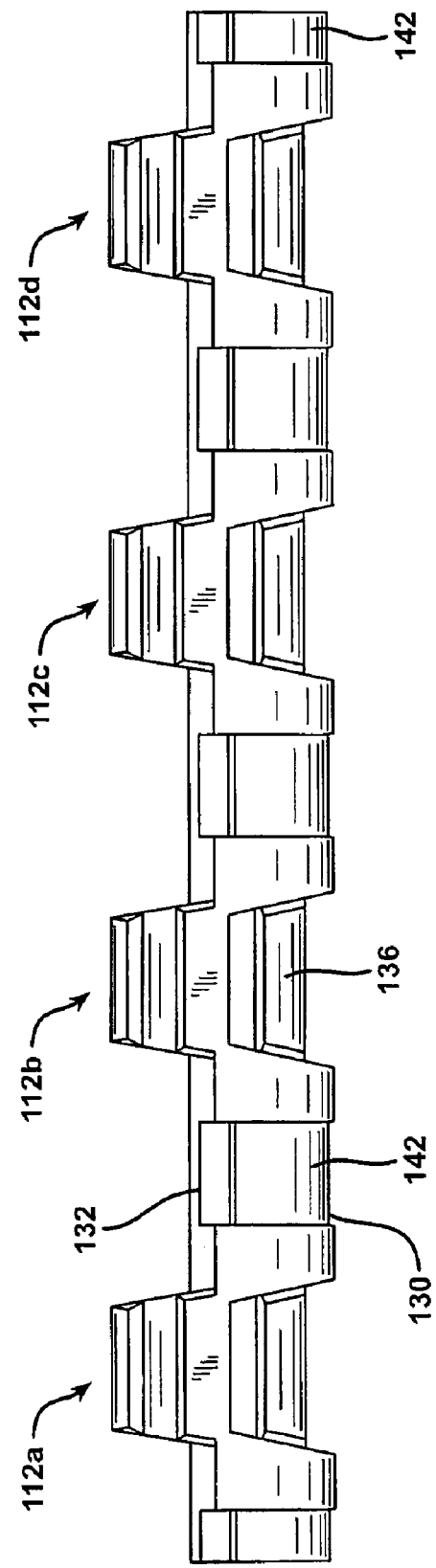
Figure 10G:
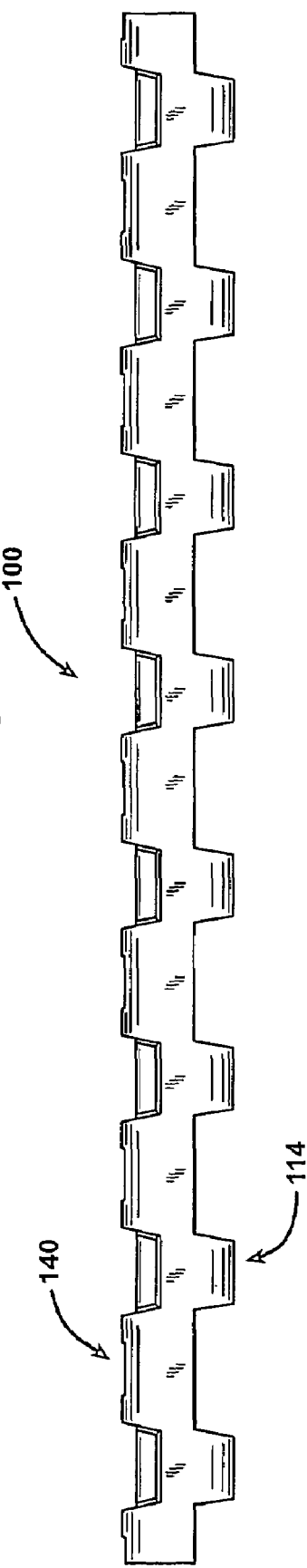
Figure 10H:
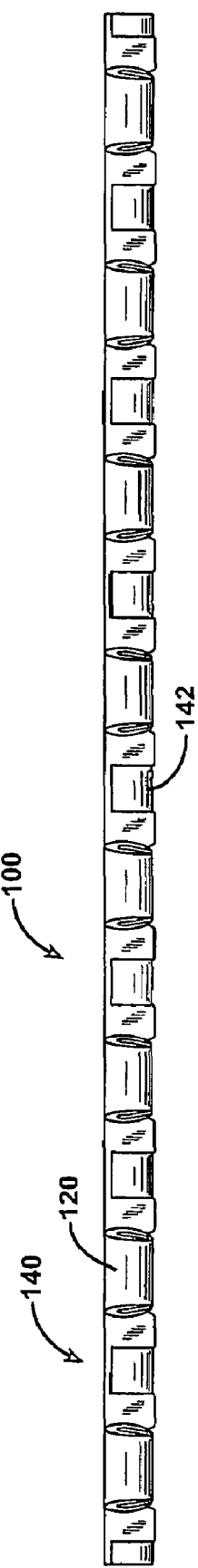
Figure 10I:
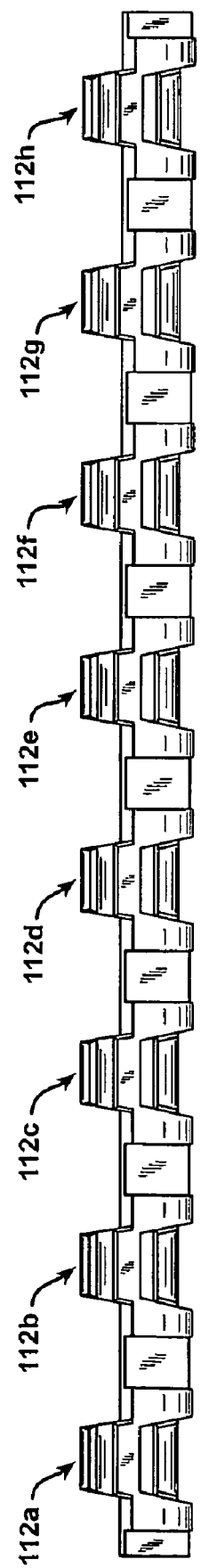
Figure 10J:
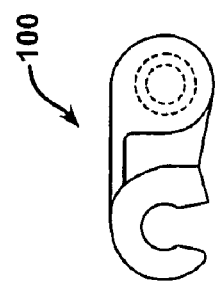

With specific reference now to FIGS. 3, 4, and 5, it can be seen that each apex portion 14 includes outer sidewalls 42 that may be tapered. Specifically, by comparing FIGS. 3 and 4, it is noted that these outer sidewalls 42 are tapered in two different vertically oriented planes, including: (1) a first taper having its widest extent at the portion of the apex portion 14 adjacent to the leg portions 22, 24 and tapering toward the nose portion 16 (FIG. 3); and (2) a second taper having its widest extent at the upper surface 20 of the apex portion 14 and tapering toward the underside surface 44 of the link section 10. As perhaps best shown in FIG. 3, the inner walls 30 of each leg portion 22, 24 are also sloped so as match the taper of the sidewalls 42 (which in this case, makes the inner walls outwardly divergent). Consequently, when two of the link sections 10a, 10b are interconnected to form a belt section 50 (such as is shown in FIGS. 6-8 and described further below), smooth, relative pivoting movement may result. However, because of the taper and matching slope of the sidewalls 30, 42, the degree to which adjacent link sections 10a, 10b pivot relative to one another may be precisely controlled. In other words, a limit on the amount of pivoting movement that can be achieved by one link section 10a may be controlled by providing the outer sidewalls 42 of the apex portion 14 with a taper greater than or less than the slope of the corresponding inner sidewalls 30 of the next-adjacent link section 10b.

Figure 6A:
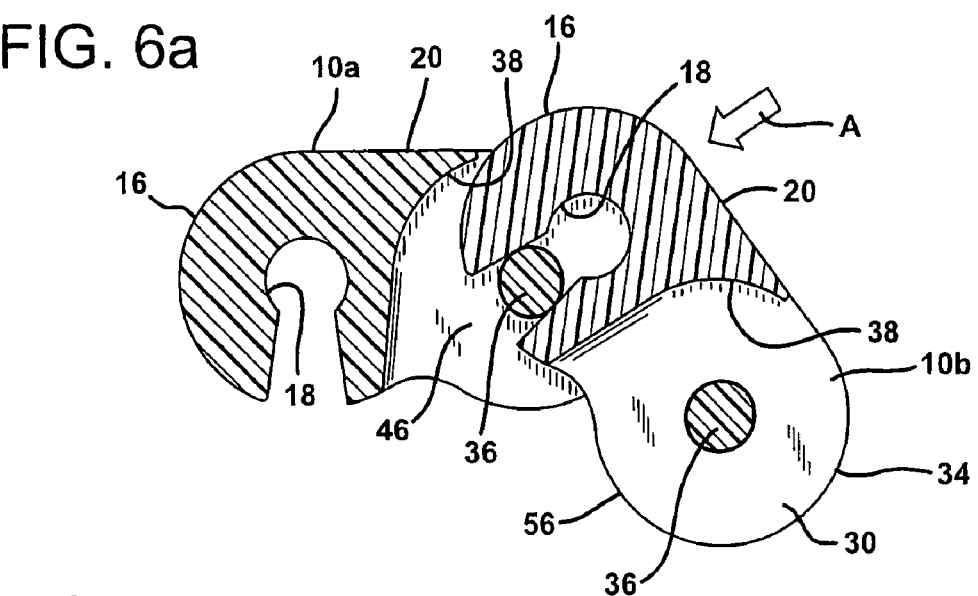
FIG. 6a is an enlarged, partially cross-sectional side view of two of the links or link sections of FIG. 1 being interconnected to form a belt section.
Figure 6B:
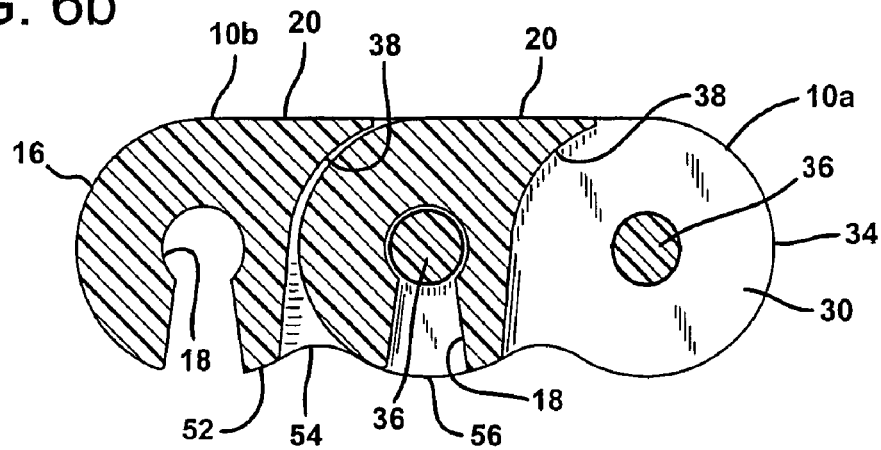
FIG. 6b is an enlarged cross-sectional view showing the two interconnected links or link sections along line 6b-6b of FIG. 6d.

Turning now to FIGS. 6a and 6b, the manner in which two or more of the link sections 10a . . . 10n are interconnected to form the belt section 50 is illustrated in detail. FIG. 6a shows that two link sections 10a, 10b may be interconnected by positioning the first integral connectors 36 on each link-like portion 12a . . . 12d in the entryway 46 of the receiver 18 formed in each apex portion 14. It should be appreciated from FIG. 6a that the protruding nature of the nose portion 16 may interfere with an overhang created by the combination of the upper surface 20 of the apex portion 14 and the arcuate recessed portion 38 formed adjacent thereto. Hence, to position each first connector 36 in the entryway 46 of the corresponding receiver 18 in this embodiment in the most efficient and effective manner, the second link section 10b should be positioned at an angle relative to the first link section 10a. From this position, gentle finger pressure may then be applied to either or both of the link sections 10a, 10b (note action arrow A in FIG. 6a) such that each first connector 36 passes along the tapered sidewalls 48 and past the neck N to form a secure, snap-fit engagement in the receiver 18 (see FIG. 6b).

In the preferred embodiment, the link sections 10a, 10b are fabricated of lightweight, low-cost wear-resistant plastics materials (Acetal, UHMW polypropylene, etc.). While these materials are generally rigid, the design of the apex portion 14 is such that the nose portion 16 is capable of flexing outwardly relative to the remainder of the link section 10a or 10b to at least a limited degree. Consequently, each first connector 36 may pass through the neck N with the application of only a moderate amount of force (such as finger pressure), yet remains securely captured once in place in the receiver 18 as a result of the "snap-back" action that occurs once the connector passes the neck. It should also now be appreciated that providing the first integral connector 36 with a smaller diameter relative to the second connector 40 may be a desirable feature, since it may allow for the corresponding receiver 18 to consume less of the material forming the apex portion 14 and may contribute to the overall strength of the link section 10.

As can be appreciated from viewing FIG. 6b, each receiver 18 is slightly oversized relative to the corresponding first connector 36. Accordingly, when the two link sections 10a, 10b are interconnected in snap-fit engagement, one is capable of pivoting relative to the other. Hence, once the desired snap-fit engagement is established between the receivers 18 and the corresponding first connectors 36, the next-adjacent link 10b is simply rotated into position, with the cooperating leading recess portion 32 and curved trailing surface 34 on the leg portions 22, 24 and the cooperating nose portion 16 and recessed portion 38 on the nested apex portions 14 freely moving relative to one another.

Figure 6C:
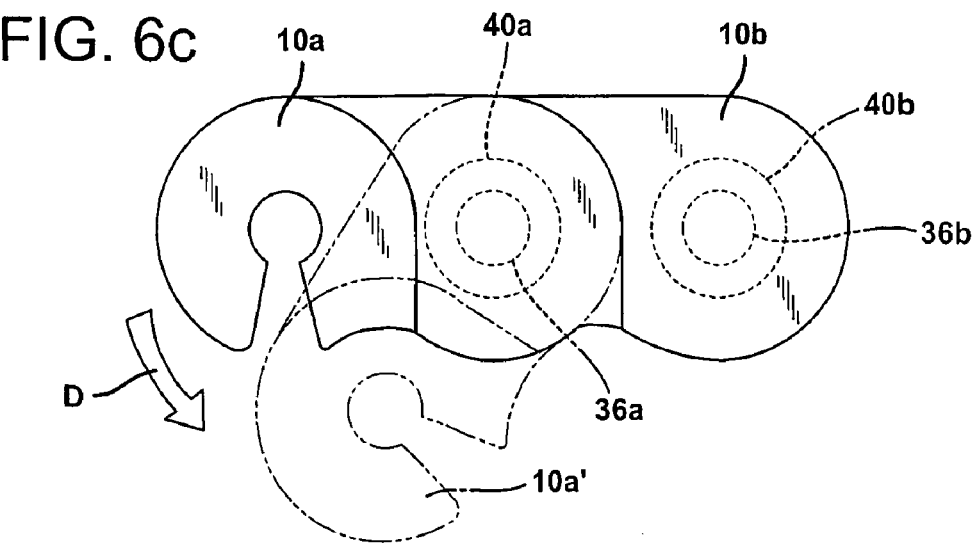
FIG. 6c is an enlarged side view showing the relative pivoting movement of one link or link section relative to the other when interconnected.
Figure 6D:
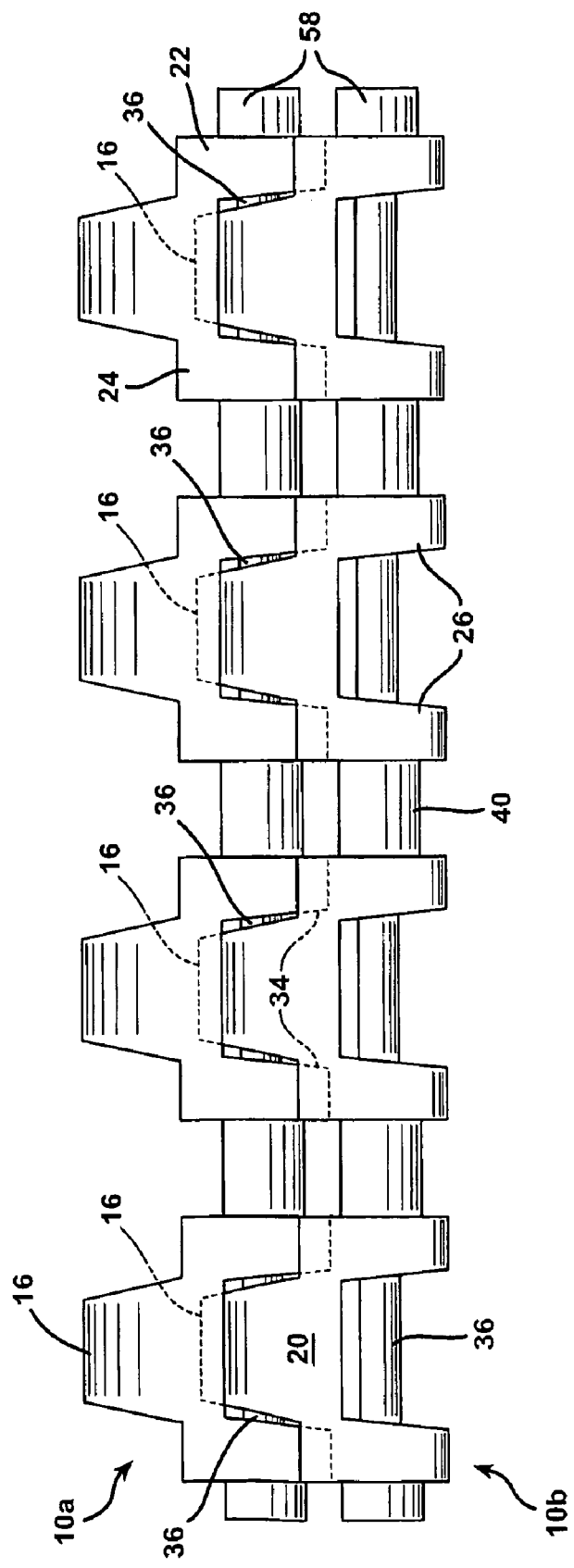

As perhaps best shown in FIG. 6d, when two adjacent link sections 10a, 10b are interconnected, the slight overhang that may optionally be created by the upper surface 20 of the apex portion 14 of the first or leading link section 10a advantageously serves to cover the arcuate or curved nose 16 of the apex portion 14 of the next-adjacent, second, or trailing link section 10b. Likewise, an overhang may be created by the upper surface 26 of the leg portions 22, 24 of the second or trailing link 10b to partially cover the arcuate or curved trailing surface 34 of the leg portions 22, 24 of the next-adjacent, first, or leading link 10a. The result is a generally planar and substantially continuous conveying surface between the link-shaped portions 12 of link sections 10a, 10b capable of engaging, supporting, or assisting in supporting objects, such as products or articles being conveyed.

In the illustrated embodiment, the link sections 10a, 10b are capable of pivoting through a range of approximately 85° (from about positive 25° in the first quadrant to about negative 60° in the fourth quadrant (300° when measured from the horizontal or X-axis); note action arrow P in FIG. 6c and the position of phantom link section 10a'). As noted above, increasing or decreasing this range is possible by changing the relative orientation of the matching sidewalls 30, 42. For instance, orienting the sidewalls 30, 42 generally perpendicular to a transverse axis and substantially parallel to each other may allow for a greater degree of pivoting movement. Likewise, changing the taper of one sidewall 30, 42 without making a corresponding change to the other may serve to limit the degree of relative pivoting movement. The ultimate choice depends on the characteristics desired for a particular application. In any case, it should be appreciated that an extreme range of pivoting may at the upper and lower ends result in a "closing up" the space between the second integral connectors 40 for receiving a sprocket tooth (see FIG. 8). Consequently, the range of pivoting provided should be kept in check during the design process.

As perhaps best shown by viewing FIG. 6b, an option is to form the link sections 10a . . . 10n with specially contoured or curved underside surfaces 44. Specifically, the lowermost portion 52 of the wall forming the backside surface or recess 38 of each apex portion 14 preferably slopes or curves upwardly to meet with the lowermost portion 54 of the sidewall 42 of the apex portion 14, which is gently sloped or rounded (see FIG. 5). The adjacent underside of each leg portion 22, 24 slopes or curves downwardly and then gently upwardly to form a rounded or bulbous lower surface 56 coextensive with the arcuate or curved rear or trailing portion 34. As a result of this arrangement, when two or more adjacent link sections 10a, 10b are thus pivoted a certain preselected amount relative to one another (see angle α in FIG. 7, which is about 126-127° in the illustrated embodiment), the specially contoured undersides match to provide the resulting belt section 50 with an essentially curved profile. As depicted in FIG. 7 with respect to only two adjacent link sections 10a, 10b, this curved profile allows for the belt section 50 to traverse smoothly over a rounded guide structure, such as the rounded end of a guide plate or a nosebar B, having a relatively small radius or diameter. For example, a belt section 50 formed of link sections 10a . . . 10n having a height of 6 millimeters when measured from the bottom of the link (such as adjacent to the bulbous portion) to the top surface of the link and a pitch of 5 millimeters (height-to-pitch ratio of about 1.2) can smoothly traverse over a cylindrical nosebar B or similar rounded structure (such as the rounded edge of a generally flat plate) having a diameter of about 6 millimeters, primarily due to the contoured or curved nature of the underside surfaces 44 of the link sections. Preferably, the resulting curved profile has a radius of curvature that matches that of the adjacent structure, such as nose bar B.

FIG. 8 shows the manner in which the teeth of a drive or idler sprocket S may engage the second integral connectors 40a, 40b on interconnected link sections 10a, 10b when a belt C formed of the links or link sections 10a . . . 10n is driven or guided in this manner. While the conveyor belt C is shown as being driven with the apex portion 14 as the leading portion and the leg portions 22, 24 in the trailing position (note action arrow F), it should be appreciated that a belt formed of link sections 10a . . . 10n is easily capable of being driven in the opposite direction by simply reversing the direction in which the S rotates. Moreover due to the fact that the entire outer surface of each second integral connector 40 is fully exposed, it should be appreciated that a conveyor belt C formed of a plurality of link sections 10a . . . 10n may be driven along the return run, including by one or more sprockets (not shown) positioned external to the now-inverted "upper" surface 20 of the apex portion 14. In this type of arrangement, the use of tensioning/pinch rollers or like structures may be desirable to ensure that the belt engages the sprocket(s). Of course, it is also possible to drive an endless belt formed of the link sections 10a . . . 10n using a friction drive, with any engagement roller contacting the underside surfaces 44, including the underside 56 of the leg portions 22, 24 at each end of the belt, or alternatively the upper surfaces 20, 26 along the return run, such as if tensioning rollers or the like are used (not shown). A different type of sprocket from the one shown in FIG. 8, such as one essentially having a scalloped outer surface instead of teeth (not shown), may also be used.

For purposes of illustration, each link section 10 is shown as including an optional partial or truncated integral connector 58 projecting from the outer sidewall 28 of the outermost link-shaped portions 12a, 12d. While this feature is optional, it may provide several advantages when present, depending on the particular application. First of all, it provides a surface for abutting with a guide structure, such as a guide rail, sidewall, or the like. Secondly, it may abut with a corresponding connector 58 projecting from a laterally-adjacent link section (not shown) in situations where shorter link sections are "brick-layered" with longer link sections (not shown) (e.g., two link sections spaced laterally side-by-side, each with four laterally repeating link-shaped portions, coupled to an upstream unitary link section having eight laterally repeating link-shaped portions). In this type of arrangement, the abutting connectors 58 not only cover the void that would otherwise exist between laterally adjacent link sections, but also provide a structure that may be engaged by a corresponding drive or idler sprocket positioned at the center of the longer link section (e.g., between the fourth and fifth link-shaped portions, in the case where there are eight total). Thirdly, the connector 58 may be sized and shaped to fit into and slide along a corresponding channel (not shown) formed in a guide structure, such as a sidewall supported by a support structure such as a conveyor frame. This type of arrangement can also be used in assisting in supporting a belt formed of the link sections 10a . . . 10n along the return run of the conveyor, for providing guidance as it passes through an intermediate drive structure or the like, or for other types of arrangements where simultaneously capturing, guiding, and supporting a moving belt is necessary.

FIG. 9a-9j shows two different embodiments of link sections 10 having a high-friction conveying surface CS. FIGS. 9a-9e show a link section 10 with four laterally-repeating link-shaped portions 12a-12d, and FIGS. 9f-9j show one with eight laterally repeating portions 12a-12h. The two types of link sections 10 are thus readily adapted for being formed into a belt or chain C in a brick-layered fashion (e.g., 4+4, 8, 4+4, 8, etc.; 4+8+8, 8+8+4, 8+4+8, etc.). As illustrated with respect to both embodiments, the high-function surface may be formed by providing dimples or dimple-like projections 60 in at least part of the apex portion 14 (such as the upper surface 20) and the leg portions 22, 24 (such as the upper surface 26). The projections 60 may be formed integrally during the molding process, or may be provided on separate structures that are affixed to the link 10 (such as by co-molding or adhesives). Link sections 10 with projections 60 can also be combined with "regular" links or link sections to form a composite belt section.

Embodiments of a flat top link 100 with four and eight laterally repeating link-shaped portions 112a-112d, 112a-112h are shown in FIGS. 10a-10j. This link 100 differs from link 10 primarily in that each second connector 140 present is in the form of a flat article support surface, generally planar with the upper surfaces 126 of the leg portions 122, 124 (which may also be considered to comprise part of the article support surface), rather than a "barrel-like" portion that creates a gap in the conveying surface. A first end 130 of this portion is preferably rounded and the corresponding second end 132 includes a matching curved face having a contour adapted for engaging the rounded first end of a next-adjacent link when the two are connected in snap-fit engagement. The underside of this connector 140 may include a portion 142 adapted for being engaged by a drive or idler sprocket, which may be rounded similar to the underside of the second connector 40 (see FIG. 5). The optional end stubs or truncated connectors 58 are also modified to include a flat-top portion 140 that completes the conveying surface. The flat-top portion 140 may also include the underside portion 142 adapted for engaging a drive or idler sprocket.

As should be appreciated, when a plurality of these links are interconnected, the result is a belt or chain C that includes an uninterrupted, generally flat or planar, article support surface. This continuous surface is particularly advantageous for use in applications where food products are conveyed, such as baked goods, since the upper surface of the chain can be cleaned by simply wiping it down. As should be appreciated, the link 100 of this embodiment may also be provided with a high-friction conveying surface in the manner previously described.

Figure 11A:
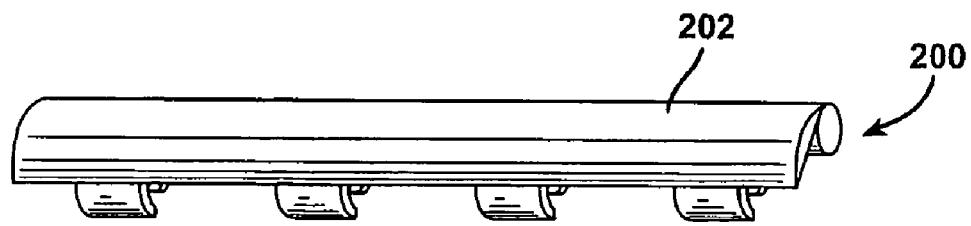
FIGS. 11a-11c depict a version of the link with a curved top surface.
Figure 11B:
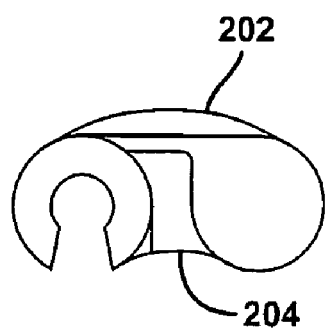
Figure 11C:
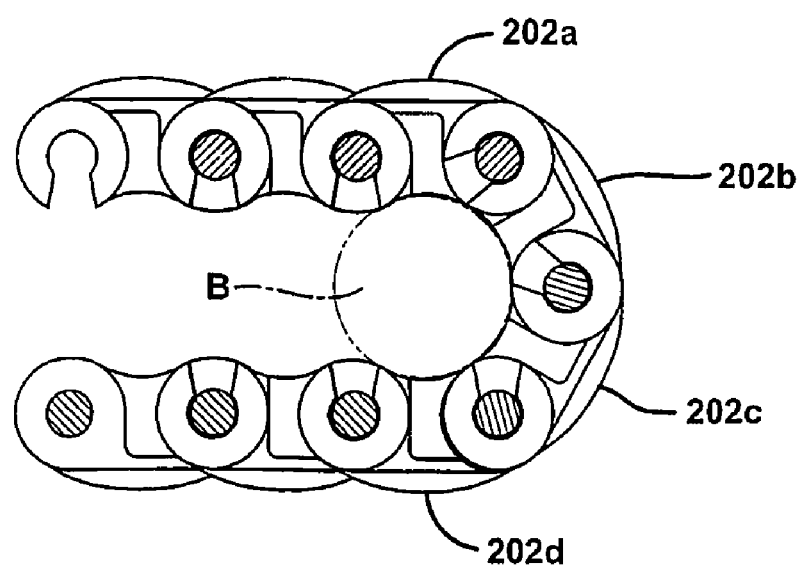

FIGS. 11a-11c show a "curved top" embodiment of a link 200. In this embodiment, each link 200 maybe substantially similar in construction to the flat top embodiment described above, but is provided with a substantially continuous, generally convex or bowed article conveying surface 202. As perhaps best shown in FIG. 11b, the contour of this surface 202 may substantially match the contour of the underside portion 204 of the link 200 (which provides it with a kidney-shaped cross-section; see FIG. 11b). When a belt or belt section formed of these links 200 is wrapped around a structure, such as a nose bar B (shown in phantom in FIG. 11c), the conveying surfaces of the plurality of links (see, e.g., surfaces 202a, 202b, 202c, and 202d in FIG. 11c) follow the contour of the structure to form a generally circular configuration along the outer surface (see FIG. 11a). This is advantageous, in that as the belt or chain C formed of links 200 moves from the forward to the return run, or vice-versa, it presents a continuously curving surface to an adjacent structure, such as the fingers on a bridge or other structure normally associated with a transfer conveyor. The belt or chain C of this embodiment formed of the links 200 essentially behaves more like a piece of fabric or cloth passing the transfer than one formed of regular pitch links with a flat surface, which presents a varied or constantly changing surface to the bridge, transfer, or other structure. The convex conveying surface 202 may be unitary with each link section 200, or may be a provided on a separate component for attachment to a "regular" link section 10, 100, such as using welding, adhesives, snaps, or the like.

Figure 12A:
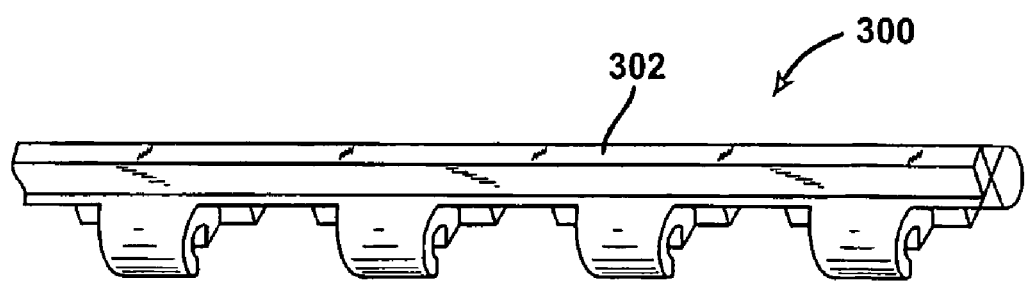
FIGS. 12a and 12b are perspective and cross-sectional side views showing a version of the link with a cleat.
Figure 12B:
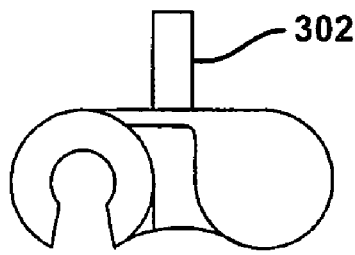

FIGS. 12a and 12b show a version of the link 300 in which a generally upstanding cleat 302 forms part of the conveying surface. These links 300 may be spaced with other, non-cleated links to form a belt or belt section capable of selectively engaging and conveying articles of a particular type or size. Alternatively, links without cleats may be brick-layered with links 300 having cleats to form a specialized type of conveying surface for engaging and conveying a particular variety of articles. The cleats 302 may be unitary or otherwise.

Figure 13B:
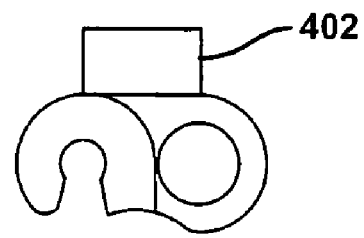
FIGS. 13a and 13b are perspective and cross-sectional side views showing a raised-top version of the link.
Figure 13A:
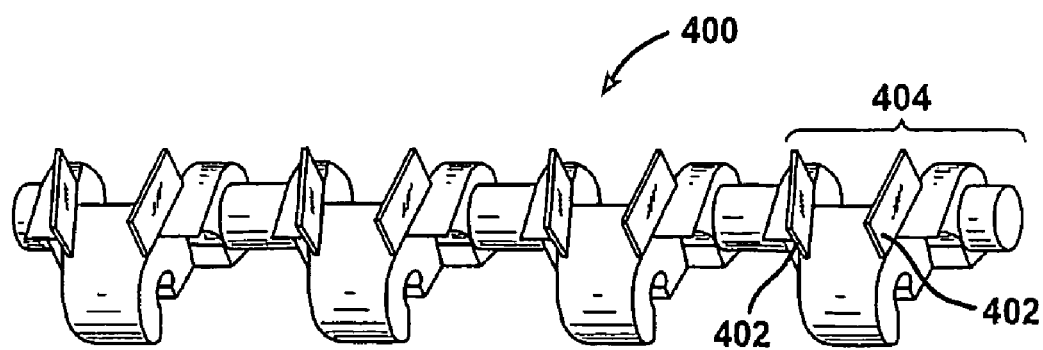

FIGS. 13a and 13b show a link 400 with a raised top surface in which a pair of generally upstanding lugs 402 are provided on each laterally-repeating link section 404 or portion for assisting in engaging the articles being conveyed. The lugs 402 are generally oriented in the direction of travel, and may be angled slightly to improve their article-engaging capabilities. Instead of or in combination with raised top links, the use of brush top, scoop cleats, and laterally movable guides is also possible. The use of well-known types of co-molding techniques to include a resilient insert in the body of each link or link section having one or more outwardly extending, resilient fingers to form a high friction surface is also possible.

In some of the drawing figures, the link sections 10, 100, 200, 300 are shown as being somewhat enlarged. In the most preferred embodiment, each link section 10a, 10b preferably has a height H of approximately 6 millimeters (see FIG. 4), and most preferably has a lesser height of about 4 millimeters. Moreover, the width as measured from one end of the link-shaped portion 12d to the imaginary opposite end (which is at the midpoint of the second connector 40; see reference character W in FIG. 4) is about 15 millimeters (which, in the case of the exemplary link having a 4 millimeter height, makes the height to width ratio 1:3.75, and in the case of an exemplary link having a 6 millimeter height, makes this ratio 2.5). Hence, four of the laterally repeating link-shaped portions 12a-12d (including the partial connectors 58) create a link section 10 approximately 60 millimeters wide, and eight create a link section approximately 120 millimeters wide. The distance from about the center of the receiver 18 to about the center of the first connector 36 (see dimension D in FIG. 2, which generally defines the pitch of the link and is usually what is referred to as the "pitch" of the belt or chain formed of the links) is most preferably 5 millimeters. Thus, the "height-to-pitch" ratio of a link (H/D) having this preferred range of dimensions is about 1 when speaking in terms of one significant figure and, more specifically, from about 0.8 (4 millimeters/5 millimeters) to about 1.2 (6 millimeters/5 millimeters) when speaking in terms of two significant figures. These exemplary ratios are provided without regard for variations in tolerances that inevitably result from mold imperfections, wear, or the like. Moreover, it should be appreciated that all dimensions are provided merely for purposes of illustrating one exemplary or most preferred embodiment, and are generally not designed to limit the invention being disclosed in any way.

A conveyor belt or chain C formed of the link sections 10a . . . 10n may be supported and guided using any conventional arrangement, including well-known types of support beds, rails, or the like. Instead of stub connectors 58, it is also possible to adapt the ends of the link section 10 to include depending side and with inwardly projecting guide tabs for engaging a guide rail (not shown), as disclosed in the commonly assigned '693 and '757 patents. As should be appreciated, a "regular" sized, non-"micropitch" link formed in accordance with the teachings of the present application is more amenable to having these types of depending and inwardly projecting structures, since weakening due to the smaller dimensions may be less of a concern.

Numerous modifications are possible in light of the foregoing teachings. For example, as briefly noted above, it is possible to orient the sidewalls 30, 42 such that each is generally perpendicular to an imaginary centerline axis extending through the transverse integral connector rods 36, 40. This design may provide the adjacent links with more freedom in terms of relative pivoting movement. Also, while four link-shaped portions 12a-12d are shown for purposes of illustration, it should be appreciated that as few as two may be included. The maximum number of link-shaped portions is limited only by constraints such as the strength of the material used in forming the link sections (which of course may vary depending on the size and the particular application).

Additionally, the number of second integral connectors 40 provided may also be adjusted as necessary or desired to achieve a particular purpose. For example, in the case where there are four link-shaped portions 12a-12d, it is possible to provide a second integral connector 40 between portions 12a and 12b and between portions 12c and 12d, each for engaging a corresponding drive or idler sprocket. Portions 12b and 12c can simply be merged together at the interface between the outer sidewalls 28 of the corresponding leg portions 22, 24 (not shown). In cases where a belt formed of the link sections 10a . . . 10n is not sprocket-driven, the second integral connectors 40 could be eliminated altogether, with the adjacent leg portions 22, 24 simply being merged together. However, in terms of ease of belt design and manufacturing flexibility, it is preferable to create symmetrical link sections 10a . . . 10n that laterally repeat with the same predictable frequency.

The relative size and width of the apex portion 14 and the leg portions 22, 24 may also be changed as necessary to achieve a particular result. For example, in the case where a slightly stronger link section is required, it maybe beneficial to widen the leg portions 22, 24 and shorten the apex portion 14 in the transverse or width dimension. The sizes, shapes, and relative orientations of the receiver 18 and the connectors 36, 40 may also be changed as necessary, such as to strengthen the link section 10 or achieve any other desired result. It should be further appreciated that, in the "regular" pitch version of the link section 10 formed of lightweight plastic materials, the use of integral connectors in place of the conventional stainless steel connector rods may substantially reduce the weight of the resulting belt or chain C. This generally means that less support and driving force are required for a chain formed of these links or link sections 10, as compared to one having stainless steel connector rods.

It is also possible to construct an embodiment of the link section 10 in which the first integral connector 36 is positioned between but does not extend completely from one inner sidewall 30 to the other. Instead, the connector may comprise two opposed, spaced stub shafts (not shown, but see partial projection 58) that project inwardly from each sidewall 30. With this embodiment, it should be further appreciated that the receiver 18 may be divided by a wall or partition (not shown) into two receivers, one of which receives each stub shaft comprising the integral connector 36. The wall or partition does serve to strengthen the resulting link section 10, but is generally considered optional. This embodiment is somewhat less preferred, since the opposed stub shafts are considerably weaker than the continuous connector 36, especially in the "micropitch" arrangement.

Also, it is fairly well-known in the art that the use of identical plastic materials in each adjacent link section may result in squeaking. While this does not affect the operational characteristics or performance of a belt or chain formed of these link sections, it can be an annoyance. Therefore, the desirability of forming the adjacent interconnected link sections of two different types of plastics materials is noted. It is believed to be a matter of ordinary or routine skill to select suitable plastic materials or combinations thereof to eliminate squeaking or to provide any other desirable characteristics.

Finally, in the case of links formed having the dimensions disclosed herein to create a "micropitch" belt (that is, one formed of links having a height-to-pitch ratio of about 1.0), it is possible to provide only one link-shaped portion 12 that interconnects with the link-shaped portions of first and second adjacent links or link sections 10*a*, 10*b* in snap-fit engagement to form a narrow-width belt or chain C. Examples of such a link 10 and a chain C formed of links 10*a*, 10*b* are shown in FIGS. 14*a*, 14*b*, 14*c*, and 14*d*. A plurality of belts or chains formed of such links may then be arranged side-by-side and gang driven to create the conveyor.

The foregoing descriptions of the various embodiments of the link or link section forming one aspect of the invention and the belt or chain section forming another are presented for purposes of illustration and description. These descriptions are not intended to be exhaustive or to limit the invention to the precise form disclosed. For example, the terms "apex" or "legs" are merely used to describe structures of each link section 10, and are not intended to limit the link section to a particular shape, size, or orientation, or to limit the bidirectional driving capabilities of a belt formed of such link sections. Modifications or variations are also possible in light of the above teachings. The embodiments chosen were described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A modular link section for coupling with an adjacent link or link section to form a part of a continuous rodless conveyor belt for conveying articles or products, comprising:

a first link comprising a unitary body including a plurality of laterally repeating first link-shaped portions, each having a surface capable of engaging or assisting in supporting the articles or products being conveyed, a pair of first leg portions, at least one first integral connector interconnecting the first leg portions of each link-shaped portion, and at least one second integral connector interconnecting one leg portion of each adjacent link-shaped portion; and a second link including a plurality of laterally repeating second link-shaped portions, each having a receiver capable of receiving the first integral connector of the first link in snap-fit engagement, whereby the snap-fit engagement allows for the easy and secure assembly of the first and second links to form the part of the conveyor belt.

2. The link section according to claim 1, wherein the receiver and first integral connector are arranged so as to provide the link section with a micropitch.

3. A unitary modular link for coupling with an adjacent link to form a part of a rodless continuous conveyor belt for conveying articles or products, comprising:

a plurality of laterally repeating apex portions, each including a surface capable of engaging or assisting in supporting the articles or products being conveyed;

a pair of leg portions extending from each said apex portion; and at least one integral connector interconnecting the leg portions associated with each apex portion;

wherein each apex portion includes a receiver capable of receiving a portion of the adjacent link in snap-fit engagement, whereby the snap-fit engagement allows for the easy and secure assembly of the link with the adjacent link to form the part of the conveyor belt.

4. The link according to claim 3, wherein the receiver and first integral connector are arranged so as to provide the link section with a micropitch.

5. The link according to claim 3, wherein the receiver in each apex portion includes an oversized entryway and a pair of opposed inwardly sloping sidewalls forming a neck, whereby the portion of the next-adjacent link passes through the oversized entryway, along the sloping sidewalls, and snaps past the neck to become captured in the receiver and form the desired snap-fit engagement.

6. The link according to claim 3, wherein the leg portions of each apex portion include an outer sidewall and a second integral connector is provided between the outer sidewall of one leg portion of a first apex portion and the adjacent outer sidewall of one leg portion of a second, adjacent apex portion.

7. The link according to claim 3, wherein:

each apex portion includes a pair of outer sidewalls, each having a taper in the vertical plane;

each leg portion includes an inner sidewall having a slope that corresponds to the taper.

8. A modular link conveyor belt section for forming a part of an endless, rodless conveyor belt for conveying articles or products, comprising:

a plurality of unitary link sections, each including a plurality of laterally repeating link-shaped portions, and each having a surface for engaging or assisting in supporting the articles or products, a pair of leg portions, and at least one first integral connector;

wherein each link-shaped portion on a first one of said link sections includes a receiver for receiving the first integral connector of a second, adjacent link section in snap-fit engagement such that the first link section is capable of pivoting movement relative to the second link section, said receiver and first integral connector arranged so as to provide the adjoining link sections with a micropitch;

whereby the snap-fit engagement allows for the easy and secure assembly of the link sections to form the conveyor belt section.

9. The belt section according to claim 8, wherein the underside surfaces of said first and second link sections are specially contoured or curved such that when the link sections are pivoted a preselected amount, the contoured or curved underside surfaces correspond to the contour of an adjacent guide structure, whereby smooth travel of the belt section over the guide structure is facilitated.

10. The belt section according to claim 8, wherein each link-shaped portion includes an apex portion having a generally arcuate or rounded nose and a matching recess, whereby the nose of each apex portion on the first link section cooperates with the recess of each apex portion on the second link section during relative pivoting movement.

11. The belt section according to claim 8, wherein each leg portion includes a generally arcuate or rounded leading recess and a matching trailing surface, whereby the trailing surface of each leg portion on the first link section cooperates with the leading recess of each leg portion on the second link section during relative pivoting movement.

12. A unitary modular link section for intended use in coupling with an adjacent link or link section to form a part of a continuous rodless conveyor belt for conveying articles or products, comprising:

a plurality of laterally repeating link-shaped portions interfitting in snap-fit engagement, each having a surface capable of engaging or assisting in supporting the articles or products being conveyed, wherein a ratio of the height of each link-shaped portion to the width of each link-shaped portion is about 3.75;

whereby the snap-fit engagement allows for the easy and secure assembly of the link section with the next-adjacent link or link section to form the part of the conveyor belt.

13. A unitary modular link section for intended use in coupling with an adjacent link or link section to form a part of a continuous rodless conveyor belt for conveying articles or products, comprising:

a plurality of laterally repeating link-shaped portions, each having a surface capable of engaging or assisting in supporting the articles or products being conveyed, wherein a ratio of the height of each link-shaped portion to the width of each link-shaped portion is about 2.5;

whereby the snap-fit engagement allows for the easy and secure assembly of the link section with the next-adjacent link or link section to form the part of the conveyor belt.

14. A unitary modular link for intended use in coupling with first and second adjacent links to form a part of a continuous rodless conveyor belt for conveying articles or products, comprising:

at least one link-shaped portion having a receiver for receiving the first adjacent link in snap-fit engagement, a connector for connecting with the second adjacent link, a surface capable of engaging or assisting in supporting the articles or products being conveyed, and a height of about six millimeters or less;

whereby the snap-fit engagement allows for the easy and secure assembly of the link section with the next-adjacent link or link section to form the part of the conveyor belt.

15. The link according to claim 14, wherein the height of the link-shaped portion is about four millimeters and a width of the link-shaped portion is about fifteen millimeters.

16. The link according to claim 15, wherein four laterally-repeating link-shaped portions are provided.

17. The link according to claim 15, wherein eight laterally-repeating link-shaped portions are provided.

18. A unitary modular link section for coupling with an adjacent link or link section to form a part of a continuous rodless conveyor belt driven by a drive sprocket for conveying articles or products, comprising:

a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement, wherein a second integral connector adapted for engaging the drive sprocket extends transverse to the conveying direction, parallel to the first connector and between the leg portions of adjacent link-shaped portions and defines at least a portion of the article support surface;

whereby a substantially continuous or uninterrupted article support surface is provided.

19. A link for intended use in coupling with first and second adjacent links in snap-fit engagement to form a part of a continuous rodless conveyor belt or chain for conveying articles or products, comprising a body including a receiver capable of receiving a portion of the first adjacent link in snap-fit engagement, a connector adapted for being received by the second adjacent link, and a surface capable of engaging or assisting in supporting the articles or products being conveyed, wherein a ratio of the height of the body to a pitch of the link is about 1.0.

20. The link according to claim 19, wherein the ratio is about 0.8 to about 1.2.

21. The link according to claim 19, wherein the pitch is measured from substantially the center of the receiver to substantially the center of the connector.

22. The link according to claim 19, wherein the height of the link is between about 4-6 millimeters and the pitch of the link is about 5 millimeters.

23. A link for intended use in coupling with first and second adjacent links in snap-fit engagement to form apart of a continuous rodless conveyor belt or chain for conveying articles or products, comprising a body including a receiver capable of receiving a portion of the first adjacent link in snap-fit engagement, a connector adapted for being received by the second adjacent link, and a surface capable of engaging or assisting in supporting the articles or products being conveyed, wherein a ratio of the height of the body to a pitch of the link is greater than about 0.8.

24. The link according to claim 23, wherein the ratio is less than about 1.2.

25. A continuous rodless conveyor belt or chain, comprising:

a plurality of links, each adapted for engaging one another in snap-fit engagement and including a body having a receiver capable of receiving a portion of a first adjacent link in snap-fit engagement, a connector adapted for being received by a second adjacent link, and a surface capable of engaging or assisting in supporting the articles or products being conveyed, wherein a ratio of the height of the body to a pitch of each link is about 1.0.

26. The conveyor belt according to claim 25, wherein the ratio is between about 0.8 and about 1.2.

27. A micropitch conveyor link for conveying articles or products, comprising:

a unitary body including a plurality of laterally repeating link-shaped portions, each having an apex portion defining a conveying surface, a pair of leg portions connected to the apex portion, at least one first integral connector extending between and interconnecting the leg portions, and a receiver formed in the apex portion capable of receiving a portion of the adjacent link section in snap-fit engagement;

whereby the snap-fit engagement allows for the easy and secure assembly of the link with the adjacent link or link section without the need for a removable transverse connector rod whereby the links are intended to be coupled to form a continuous loop.

28. The link section of claim 27, wherein the pitch of the link is about 5 millimeters.

29. A modular link section coupling with an adjacent link or link section to form a part of a continuous conveyor belt for conveying articles or products, comprising:

a unitary body including a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement, wherein the leg portions of each link-shaped portion include an outer sidewall and a second integral connector is provided between the outer sidewall of one leg portion of a first link-shaped portion and the adjacent outer sidewall of one leg portion of a second, adjacent link-shaped portion, whereby the second integral connector is adapted for engaging a tooth on a chive or idler sprocket for driving or guiding the belt, and the snap-fit engagement allows for the easy and secure assembly of the link section with the adjacent link or link section to form the part of the conveyor belt.

30. A modular link section for coupling with an adjacent link or link section to form a part of a continuous rodless conveyor belt for conveying articles or products, comprising:

a unitary body including a plurality of laterally repeating link-shaped portions, each having a surface capable of engaging or assisting in supporting the articles or products being conveyed, a pair of leg portions, at least one first integral connector extending between the leg portions, and a receiver capable of receiving a portion of the adjacent link section in snap-fit engagement, wherein the receiver includes an oversized entryway and a pair of opposed inwardly sloping sidewalls forming a neck, whereby the portion of the adjacent link section may pass through the oversized entryway, along the tapered sidewalls, and past the neck to become captured in the receiver and form the desired snap-fit engagement.

31. A modular link conveyor belt section for forming a part of an endless, rodless conveyor belt for conveying articles or products, comprising:

a plurality of unitary link sections, each including a plurality of laterally repeating link-shaped portions, and each having a surface for engaging or assisting in supporting the articles or products, a pair of leg portions, and at least one first integral connector;

wherein each link-shaped portion on a first one of said link sections includes a receiver for receiving the first integral connector of a second, adjacent link section in snap-fit engagement such that the first link section is capable of pivoting movement relative to the second link section;

and further wherein:

the first integral connector extends between the leg portions of each link-shaped portion of the second link section; and the receiver of each link-shaped portion on the first link section includes an oversized entryway and a pair of opposed inwardly sloping sidewalls forming a neck, whereby each first integral connector of the second link section passes through the oversized entryway, along the inwardly sloping sidewalls, and snaps past the neck to become captured in the receiver and form the desired snap-fit engagement.

32. A modular link conveyor belt section for forming a part of an endless, rodless conveyor belt for conveying articles or products, comprising:

a plurality of unitary link sections, each including a plurality of laterally repeating link-shaped portions, and each having a surface for engaging or assisting in supporting the articles or products, a pair of leg portions, and at least one first integral connector;

wherein each link-shaped portion on a first one of said link sections includes a receiver for receiving the first integral connector of a second, adjacent link section in snap-fit engagement such that the first link section is capable of pivoting movement relative to the second link section;

and further wherein:

the leg portions of each link-shaped portion on one or both of the first and second links include an outer sidewall; and a second integral connector is provided between the outer sidewall of one leg portion of a first link-shaped portion and the adjacent outer sidewall of the leg portion of a second, adjacent link-shaped portion, whereby the second integral connector provides a surface for engaging a tooth on a drive or idler sprocket for driving or guiding the belt.

33. A modular link conveyor belt section for forming a part of an endless, rodless conveyor belt for conveying articles or products, comprising:

a plurality of unitary link sections, each including a plurality of laterally repeating link-shaped portions, and each having a surface for engaging or assisting in supporting the articles or products, a pair of leg portions, and at least one first integral connector;

wherein each link-shaped portion on a first one of said link sections includes a receiver for receiving the first integral connector of a second, adjacent link section in snap-fit engagement such that the first link section is capable of pivoting movement relative to the second link section;

and further wherein:

each link-shaped portion of the first link section includes an apex portion having a pair of outer sidewalls, each having a taper in the vertical plane;

each leg portion of the second link section includes an inner sidewall having a slope that matches the taper of the corresponding outer sidewall, wherein the matching sidewalls facilitate relative pivoting movement to a limited degree between the first and second link sections.

* * * * *

UNITED STATES PATENT AND TRADEMARK OFFICE
CERTIFICATE OF CORRECTION

PATENT NO. : 7,314,132 B2 Page 1 of 1
APPLICATION NO. : 10/505943
DATED : January 1, 2008
INVENTOR(S) : James L. Layne et al.

It is certified that error appears in the above-identified patent and that said Letters Patent is hereby corrected as shown below:

Claim 29, column 23, line 7, please replace "chive" with --drive--.

Signed and Sealed this

Thirteenth Day of May, 2008

JON W. DUDAS
*Director of the United States Patent and Trademark Office*